United States Patent
Kobayashi et al.

[11] Patent Number: 5,570,302
[45] Date of Patent: Oct. 29, 1996

[54] DISTANCE MEASURING DEVICE, AND COORDINATE INPUT APPARATUS UTILIZING THE SAME

[75] Inventors: Katsuyuki Kobayashi, Yokohama; Atsushi Tanaka, Kawasaki; Yuichiro Yoshimura, Kamakura; Ryozo Yanagisawa, Chiba-ken; Masaki Tokioka, Fujisawa; Hajime Sato, Yokohama, all of Japan

[73] Assignee: Canon Kabushiki Kaisha, Tokyo, Japan

[21] Appl. No.: 352,114

[22] Filed: Dec. 1, 1994

[30] Foreign Application Priority Data

Dec. 2, 1993 [JP] Japan ..................... 5-302889

[51] Int. Cl.$^6$ ..................... G01B 7/14
[52] U.S. Cl. ............ 364/561; 364/550; 364/571.01; 178/18; 73/597; 345/177
[58] Field of Search ..................... 364/560, 556, 364/571.01, 571.02; 367/907; 178/18, 19; 73/597, 602, 632; 345/177

[56] References Cited

U.S. PATENT DOCUMENTS

| | | | |
|---|---|---|---|
| 4,100,809 | 7/1978 | Bobrov et al. | 73/638 |
| 4,931,965 | 6/1990 | Kaneko et al. | 364/560 |
| 5,072,427 | 12/1991 | Knowles | 367/118 |
| 5,253,187 | 10/1993 | Kaneko et al. | 364/560 |
| 5,420,804 | 5/1995 | Tanaka et al. | 364/571.01 |
| 5,438,872 | 8/1995 | Kobayashi et al. | 73/597 |
| 5,484,967 | 1/1996 | Yanagisawa et al. | 178/19 |
| 5,500,492 | 3/1996 | Kobayashi et al. | 178/18 |

FOREIGN PATENT DOCUMENTS

| | | |
|---|---|---|
| 0491132 | 6/1992 | European Pat. Off. . |
| 0561339 | 9/1993 | European Pat. Off. . |

OTHER PUBLICATIONS

Kobayashi K.; "Relationship between speed of Lamb wave and measurement error on distance"; 14th Symposium on Ultrasonic Electronics.

*Primary Examiner*—Ellis B. Ramirez
*Assistant Examiner*—Kamini Shah
*Attorney, Agent, or Firm*—Fitzpatrick, Cella, Harper & Scinto

[57] ABSTRACT

In a distance measuring device for calculating the distance from the arrival time of the Lamb wave, the thickness of the propagation plate and the frequency of the Lamb wave are optimized in relation to the material of the propagation plate in order not to deteriorate the precision of distance detection even in case an approximate wave velocity is used in the calculation. The plate thickness and the frequency are so selected, in relation to the plate material, as to minimize a function G(f, d) defined by:

$$G(f, d) = Vg \cdot Vp / \{f(Vg - Vp)\}$$

wherein
f: frequency
Vg: group velocity of Lamb wave
Vp: phase velocity of Lamb wave
d: plate thickness.

6 Claims, 20 Drawing Sheets

PLATE MATERIAL : ALUMINUM

PLATE MATERIAL: STYRENE

DISTANCE MEASURING DEVICE, AND COORDINATE INPUT APPARATUS UTILIZING THE SAME

BACKGROUND OF THE INVENTION

1. Field of the Invention

The present invention relates to a coordinate input device, and more particularly a device for detecting the Lamb wave entered from a vibration source into a vibration transmitting plate by means of plural sensors provided on the vibration transmitting plate, and measuring the distances from the vibration source and the sensors based on the transmission time of the Lamb wave entered by the vibration source into said vibration transmitting plate.

2. Related Background Art

There is already known a method of calculating the distance between two points utilizing ultrasonic wave, and, as a specific application of such method, there is also known a coordinate input apparatus as disclosed in the U.S. Pat. No. 4,931,965. Such apparatus is composed of a vibration transmitting plate capable of transmitting the vibration and constituting a coordinate input plane, a coordinate input pen capable of generating vibration and constituting a coordinate input instrument, plural sensors mounted on the vibration transmitting plate for detecting the vibration, and a circuit for signal processing and coordinate calculation.

The apparatus is used for outputting the coordinate of the position designated by the coordinate input pen, to an information processing apparatus such as a personal computer. The algorithm for calculating the distance in the apparatus is constructed such that the distances from the vibration source to the sensors are at first determined on the basis of the arrival delay time of the vibration wave and the velocity thereof, and then the coordinate position is calculated in geometrical manner. The above-mentioned conventional apparatus utilizes a Lamb wave as the wave transmitting in the vibration transmitting plate, and the distance L between the vibration source and the sensor is determined by the following equation:

$$L = Vp \cdot Tp + N \cdot \lambda p$$

wherein:

Vp: phase velocity

Tp: phase delay time $\lambda p$: wavelength and an integer N is determined by:

$$N = INT\{(Vg \cdot Tg - Vp \cdot Tp)/\lambda p + 0.5\}$$

wherein:

Vg: group velocity time

Tg: group delay time which will be explained in detail in the embodiment later.

The precision of distance measurement depends on the accuracy of detection of the phase delay time Tp and the group delay time Tg, but it also depends on the preciseness of the constants employed in the calculation, i.e. group velocity Vg, phase velocity Vp and wavelength $\lambda p$.

The velocity of Lamb wave is known to be generally dependent on the plate thickness d and the frequency f of the Lamb wave. In the mass production of the distance measuring device utilizing the Lamb wave, certain fluctuation is inevitable in the components constituting the device (for example it is impossible to produce the vibration generating pens of identical vibration characteristics because a difference in the frequency characteristics is unavoidable among the vibration generating elements), so that it is difficult to maintain the frequency f and the plate thickness d constant. Stated differently it is difficult to produce the devices of which a wave velocity is constant, or the production of devices of a constant wave velocity increases the production cost because a tolerance for the components becomes more severe, a production yield is lowered or load for component inspection is increased.

It is therefore conceivable to utilize a method of determining the wave velocity in each device to set the constants for coordinate calculation. The velocity of the vibration wave can be generally obtained by determining the relation between the distance L from the vibration source to the sensor and the time t required for the wave to arrive. However, the measurement for determining such relationship between the distance L and the time t requires considerable time, and the mass producibility is affected if such measurement has to be conducted on each individual device.

For this reason, in order to determine the velocity of the Lamb wave in a simpler manner, there has been proposed a method of measuring the phase period of the detected signal waveform and setting the velocity of the wave based on the period. This method, based on a fact that the velocity (group velocity Vg and phase velocity Vp) of the Lamb wave is dependent on product of the frequency f and the plate thickness d, consists of at first measuring the frequency and then determining the group velocity Vg and the phase velocity Vp of the Lamb wave from thus measured frequency and the already known plate thickness d, which can be easily and promptly measured in the mass production for example with a laser measurement.

Such conventional method has, however, been associated with the following drawback.

When the frequency is derived from the phase period of the detected signal waveform, an error in measurement inevitably is generated, so that the set frequency always involves an error with respect to the actually needed frequency f. Accordingly, the group velocity Vg and the phase velocity Vp of the Lamb wave are determined from the frequency and the plate thickness d, thus becoming different from the actual values. For this reason, there arises a problem that the precision of the distance measurement is lowered.

SUMMARY OF THE INVENTION

In consideration of the foregoing, the distance measuring device of the present invention, for entering vibration generated by vibration input means into a vibration transmitting plate, then measuring the delay time required by the Lamb wave, generated in the vibration transmitting plate, to reach a sensor, thereby determining the distance between the position of the vibration input means on said vibration transmitting plate and the sensor, is rendered capable of distance calculation with a high precision even if errors are contained in the constants (frequency f, phase velocity Vp and group velocity Vg of the Lamb wave) used in the distance measurement, by setting the frequency f of the Lamb wave generated by the vibration generation means on the vibration transmitting plate and the thickness d of the vibration transmitting plate in which the Lamb wave propagates, in such a manner as to minimize the value of a function G(f, d) defined below:

$$G(f, d) = Vg \cdot Vp / \{f(Vg - Vp)\}$$

wherein f is the frequency of the Lamb wave.

Also the present invention is to provide a coordinate input apparatus satisfying the above-mentioned condition and further comprising means for measuring and releasing the wave arrival time tp relating to the phase velocity Vp, and distance calculation means for calculating the distance, utilizing thus released arrival time, the frequency f of the Lamb wave and the phase velocity Vp as the set constants.

Furthermore, the present invention is to provide a coordinate input apparatus satisfying the above-mentioned condition and further comprising means for measuring and releasing the wave arrival time tg relating to the group velocity Vg of the Lamb wave and the wave arrival time tp relating to the phase velocity Vp, and distance calculation means for calculating the distance, utilizing thus released arrival times, the frequency f of the Lamb wave, the phase velocity Vp and the group velocity Vg as the set constants.

DETAILED DESCRIPTION OF THE PREFERRED EMBODIMENTS

Now the present invention will be explained in detail by preferred embodiments thereof with reference to the attached drawings.

Figure 1:
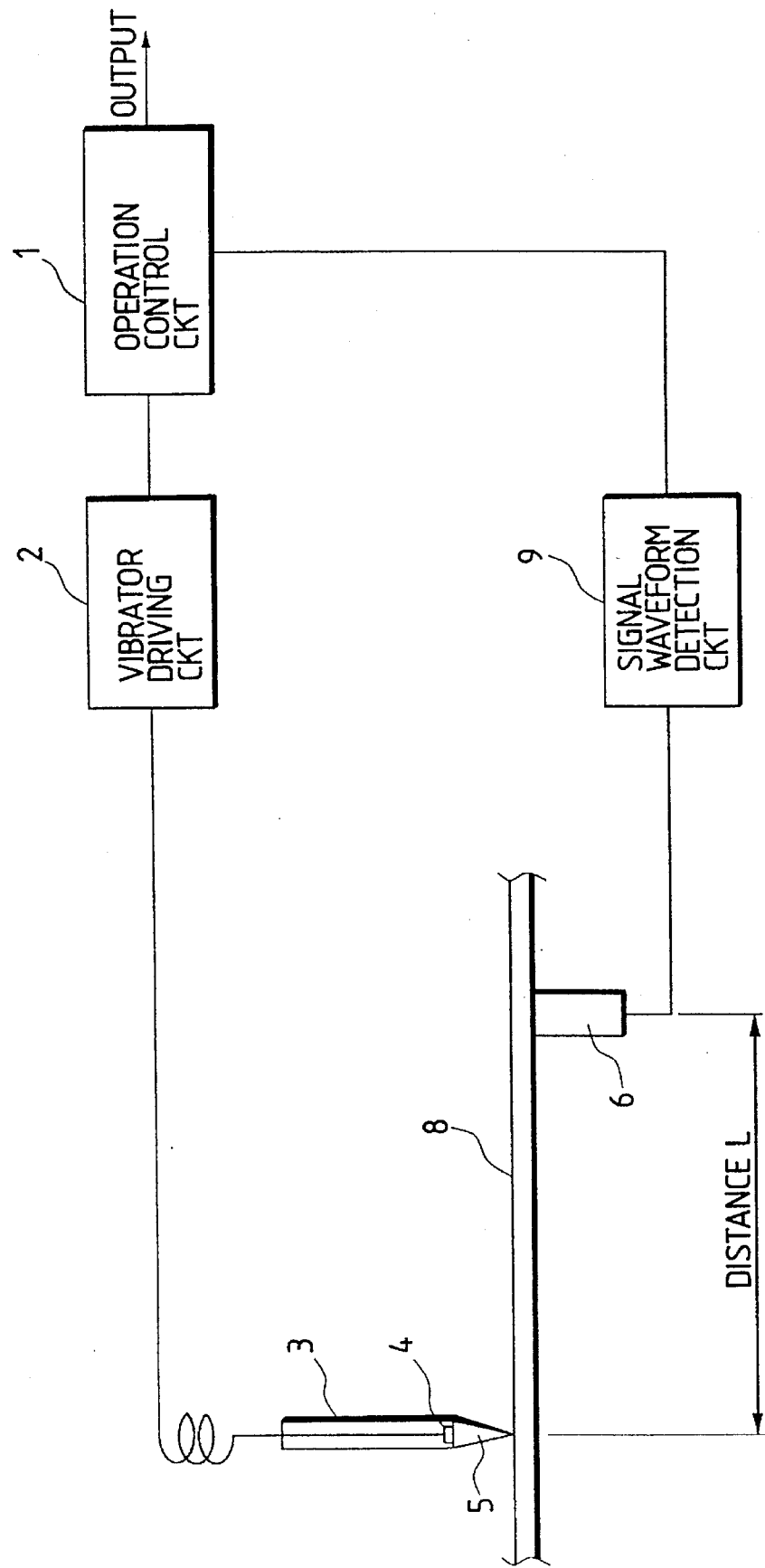
FIG. 1 is a schematic view representing the configuration of the present invention.

At first there will be explained with reference to FIG. 1, the configuration of the entire distance measuring device embodying the present invention. An operation control circuit 1 controls the entire device and calculates the distance L. A vibrator driving circuit 2 induces vibration in a vibrator 4 incorporated in a vibration source 3, and the generated vibration is entered through a contactor 5 into a vibration transmitting plate 8. The plate 8 is composed, in the present embodiment, of a glass plate, and the input of the vibration by the vibration source 3 is conducted by touching the vibration transmitting plate 8. The Lamb wave generated on the vibration transmitting plate 8 is detected by a vibration sensor 6 for converting the mechanical vibration into an electrical signal, such as a piezoelectric element, the sensor 6 being fixed on the plate 8 as illustrated. The signal from the vibration sensor 6 is amplified in an unrepresented amplification circuit, and is then supplied to a signal waveform detection circuit 9 for signal processing, of which result is supplied to the operation control circuit 1 for distance calculation. The details of the signal detection circuit 9 and the operation control circuit 1 will be explained later.

The vibrator 4 incorporated in the vibration source 3 is driven by the vibrator driving circuit 2. The drive signal for the vibrator 4 is supplied as a low-level pulse signal from the operation control circuit 1, and is amplified with a predetermined gain by the vibrator driving circuit 2, and then is supplied to the vibrator 4. The electrical drive signal is converted by the vibrator 4 into a mechanical ultrasonic vibration, which is transmitted through the contactor 5 to the vibration transmitting plate 8.

The vibration frequency of the vibrator 4 is selected at such a value as to generate a Lamb wave in the vibration transmitting plate 8 composed, for example, of glass. Efficient conversion to the vibration can be achieved by selecting the vibration frequency of the vibrator 4 at a resonance frequency including the contactor 5.

The elastic wave thus generated in the vibration transmitting plate 8 is a Lamb wave, which has an advantage that it is less influenced by the scars or obstacles on the surface of on a vibration transmitting plate in comparison with the surface wave.

Figure 2:
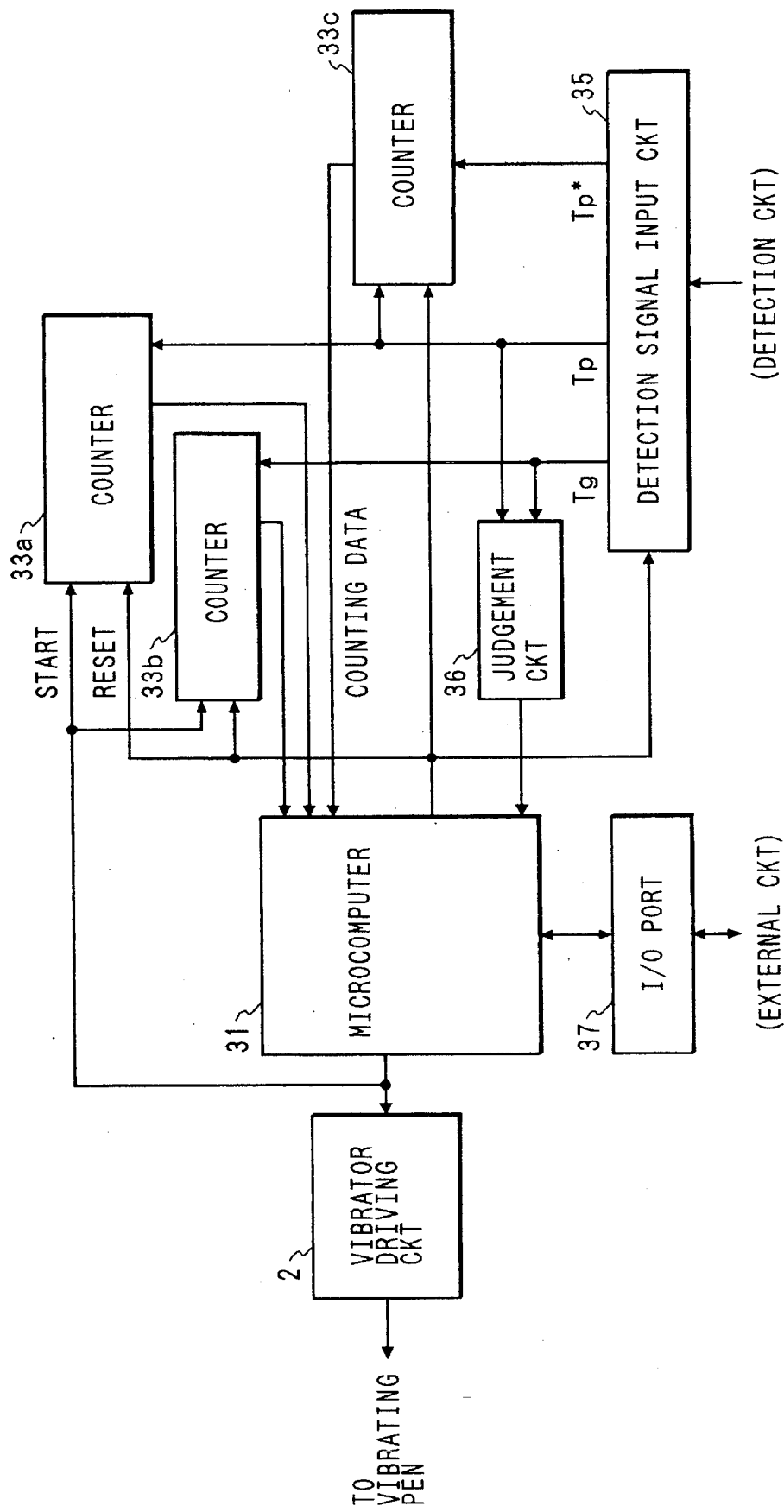
FIG. 2 is a block diagram of an operation control circuit.

Operation control circuit (FIG. 2)

In the above-explained configuration, the operation control circuit 1 supplies the vibrator driving circuit 2 with a signal for driving the vibrator 4 in the vibration source 3 at a predetermined interval (for example every 5 ms), and starts time measurement by a timer (composed of a counter) incorporated therein. The vibration generated by the vibration source 3 reaches the vibration sensor 6 with a delay corresponding to the distance thereto.

The vibration waveform detection circuit 9 detects the signal from each vibration sensor 6 to generate, by a detection process to be explained later, a signal indicating the timing of arrival of vibration to each vibration sensor. The signal is inputted to the operation control circuit 1 to detect the vibration arrival time to the vibration sensor 6 and to calculate the distance between the vibration source 3 and the sensor 6.

The operation control circuit 1 also transmits thus calculated distance information between the vibration source 3 and the sensor 6 to an external equipment (not shown) for example by serial or parallel communication.

FIG. 2 is a schematic block diagram of the operation control circuit 1 of the present embodiment, of which components and functions will be explained in the following.

A microcomputer 31 for controlling the operation control circuit 1 and the entire measuring device is provided, for example, with an internal counter., a ROM storing control sequences, a RAM used in calculation of the distance and the like, and an involatile memory for storing constants (for example, frequency f, group velocity Vg and phase velocity Vp of Lamb wave). Timers 33a to 33c (composed for example of counters) are provided for counting unrepresented reference clock signals. When a start signal is supplied to the vibrator driving circuit 2 for starting the drive of the vibrator 4 in the vibration source 3, time measurement is initiated by the counter 33a for measuring the phase delay time tp and the counter 33b for measuring the group delay time tg. In this manner the start of time measurement is synchronized with the start of generation of vibration in the vibration source 3, whereby the delay time is measured until the vibration is detected by the sensor.

Other component circuits will be explained in the following. Vibration arrival timing signals (for the phase delay time tp relating to the phase velocity Vp of the Lamb wave and for the group delay time tg relating to the group velocity Vg) released from the vibration sensor 6 through the vibration waveform detection circuit 9 are supplied through a detection signal input circuit 35 to the counters 33a, 33b, respectively. The counters 33a, 33b stop counting and latch the measured time upon receiving the timing signal from the sensor. When a judgment circuit 36 judges the release of these timing signals, the circuit 36 supplies the microcomputer 31 with signals indicating the judgment. When the microcomputer 31 receives the signal from the judgement circuit 36, the microcomputer 31 reads the vibration arrival times from the counters, and effects predetermined calculation, thereby determining the distance between the vibration source 3 and the sensor 6 on the vibration transmitting plate 8. Then, the distance information is output through an I/O port 37, for example to an external information equipment.

On the other hand, the arrival timing signal for the phase delay time tp functions as a start signal for the counter 33c, and the time measurement is stopped by a signal for measuring the period of the waveform of the detection signal, then the measured time is supplied to the microcomputer. The measurement of the repeating period may be conducted at every coordinate calculation, or in a particular timing (for example at the variation of the constants to be employed in the calculation).

Also, the counter 33c may employ the same start signal as that for the counters 33a, 33b, and in such case, the phase period of the detected signal waveform can be obtained as the difference in the counters 33a and 33c because an arrival timing signal is formed which is delayed by a cycle period from the timing signal for the phase delay time tp, to be explained later. It is also possible to achieve similar functions by using only one counter, to input the arrival timing signals into an unrepresented latch circuit, thereby latching the counts respectively corresponding to the arrival timing signals.

Figure 3:
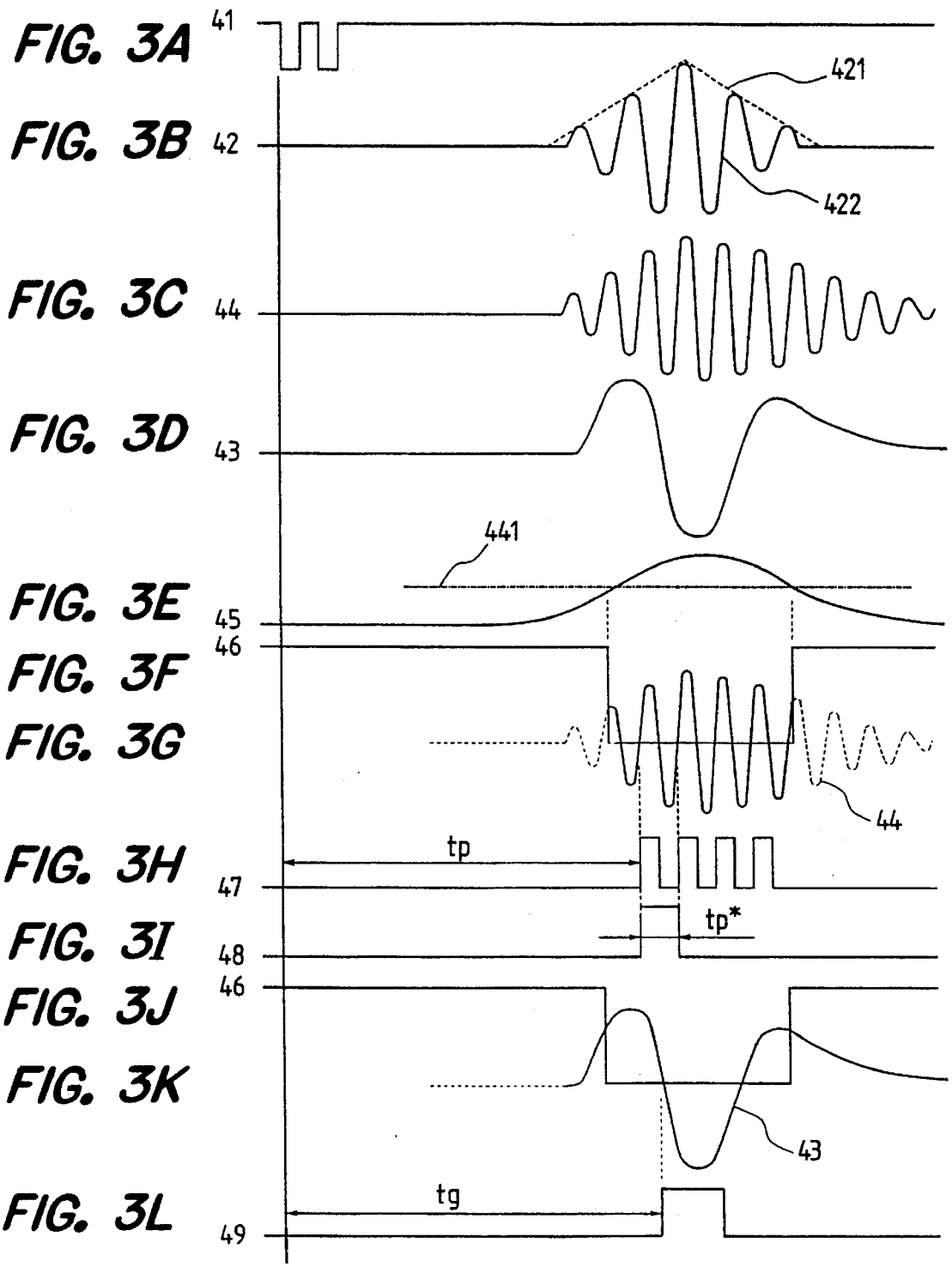
FIGS. 3A–3L comprise a timing chart of signal processing.
Figure 4:
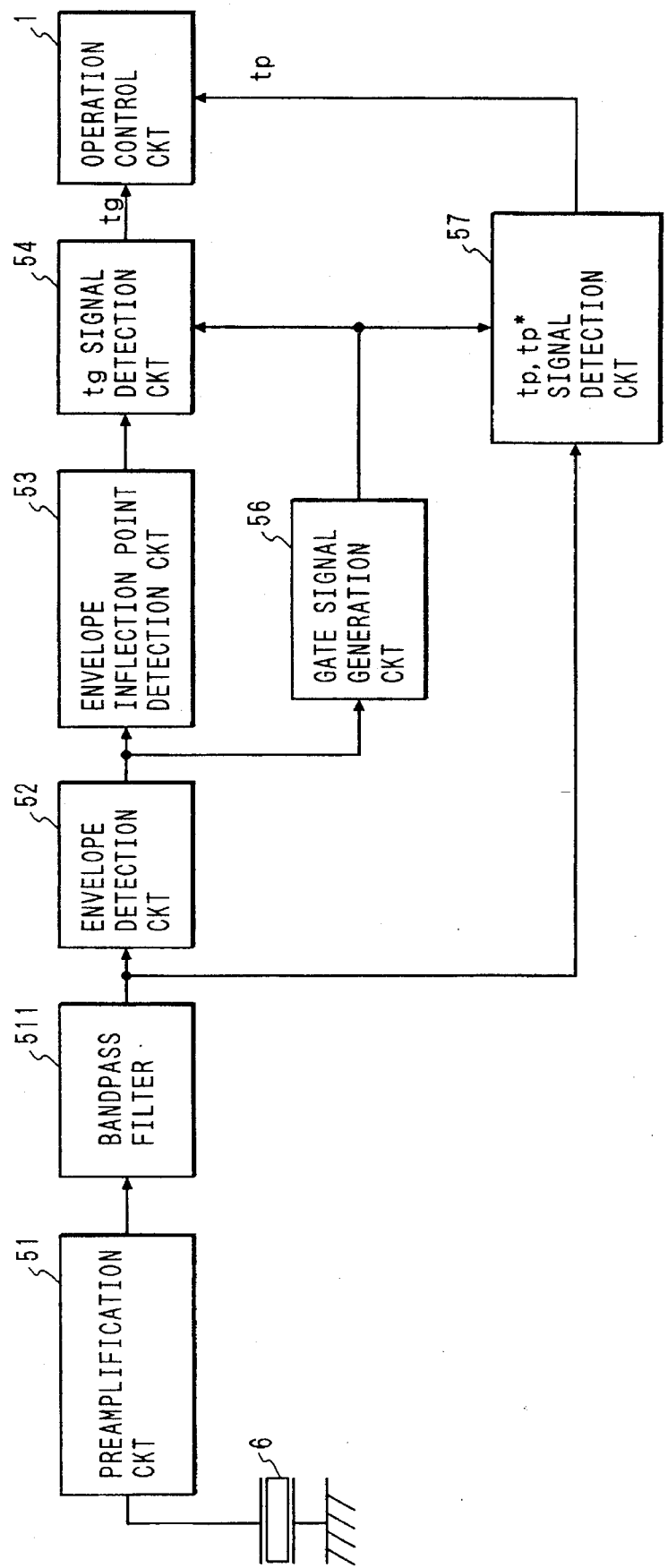
FIG. 4 is a block diagram of a signal waveform detection circuit.

Detection of vibration propagation time (FIGS. 3 and 4)

FIGS. 3A–3L comprise a chart showing the signal waveform supplied to the vibration waveform detection circuit 9 and explaining the process of measuring the vibration propagation time.

As explained in the foregoing, the measurement of the time required for transmission of the vibration to the vibration sensor 6 is started simultaneously with the supply of the start signal to the vibrator driving circuit 2. In this state a drive signal 41 has been supplied from the vibration driving circuit 2 to the vibrator 4. The ultrasonic vibration induced by the drive signal 41 and transmitted from the vibration source 3 to the vibration transmitting plate 8 propagates over a time corresponding to the distance to the vibration sensor 6, thereafter, is detected by the sensor 6. A signal 42 shown in FIG. 3B indicates a signal waveform detected by the sensor 6.

As the vibration employed in this embodiment is a Lamb wave as explained before, the propagation velocity (group velocity Vg) of the envelope 421 of the detected waveform is different from the propagation velocity (phase velocity Vp) of each phase 422. Consequently, the relationship between the envelope 421 and the phase 422 in the detected waveform varies in the course of propagation, depending on the distance of propagation. In the present embodiment, the distance between the vibration source 3 and the vibration sensor 6 is determined from the group delay time Tg based on the group velocity Vg and the phase delay time Tp based on the phase velocity Vp.

FIG. 4 is a block diagram of the signal waveform detection circuit 9. In the following there will be explained the means for detecting the group delay time Tg and phase delay time Tp, with reference to FIGS. 3 and 4.

The output signal 42 of the vibration sensor 6 is amplified to a predetermined level by a pre-amplification circuit 51, and then is subjected to the elimination of unnecessary frequency components by a band-pass filter 511, thereby obtaining a signal 44. The envelope of the waveform of the signal propagates with the group velocity Vg, and the delay time tg relating to the group velocity Vg can be obtained by detecting a particular point on the envelope, such as the peak point or the inflection point thereof. Thus, the signal amplified by the pre-amplification circuit 51 and transmitted by the band-pass filter 511 is supplied to an envelope detection circuit 52 composed of an absolute value circuit, a low-pass filter and the like, whereby the envelope 45 alone is extracted from the detected signal. Then, a gate signal generation circuit 56, composed for example of a multivibrator, forms a gate signal 46, having the duration corresponding to a period where the envelope 45 exceeds a predetermined threshold level 441.

For detecting the group delay time tg relating to the group velocity Vg, there can be detected the peak point or the inflection point of the envelope as explained above. In the present embodiment, there is detected the first inflection point (downshift zero-cross point of a signal 43 to be explained later) of the envelope. The signal 45 from the envelope detection circuit 52 is supplied to an envelope inflection point detection circuit to obtain a twice differentiated waveform 43 of the envelope. A tg signal detection circuit 54 composed for example of a multivibrator compares the differentiated signal 43 with the gate signal 46, thereby forming a tg signal 49, which is an envelope delay time detection signal and is supplied to the operation control circuit 1.

On the other hand, the phase delay time tp relating to the phase velocity Vp is detected in the following manner. A tp,Tp* signal detection circuit 57, composed of a zero-cross comparator, a multivibrator and the like for detecting the phase delay time tp, detects the first upshift zero-cross point (first phase shift from negative to positive) of the phase signal 44 during the duration of the gate signal 46, thereby supplying the operation control circuit 1 with a signal 47 representing the phase delay time tp.

Also, the tp,Tp* signal detection circuit 57 detects, for determining the phase period of the detected signal waveform from the sensor 6, a zero-cross point after a cycle period from the above-mentioned detection point for the phase delay time tp, and supplies the operation control circuit 1 with a signal 48 indicating the time Tp* between the zero-cross point and the detection point for the phase delay time tp.

Figure 5:
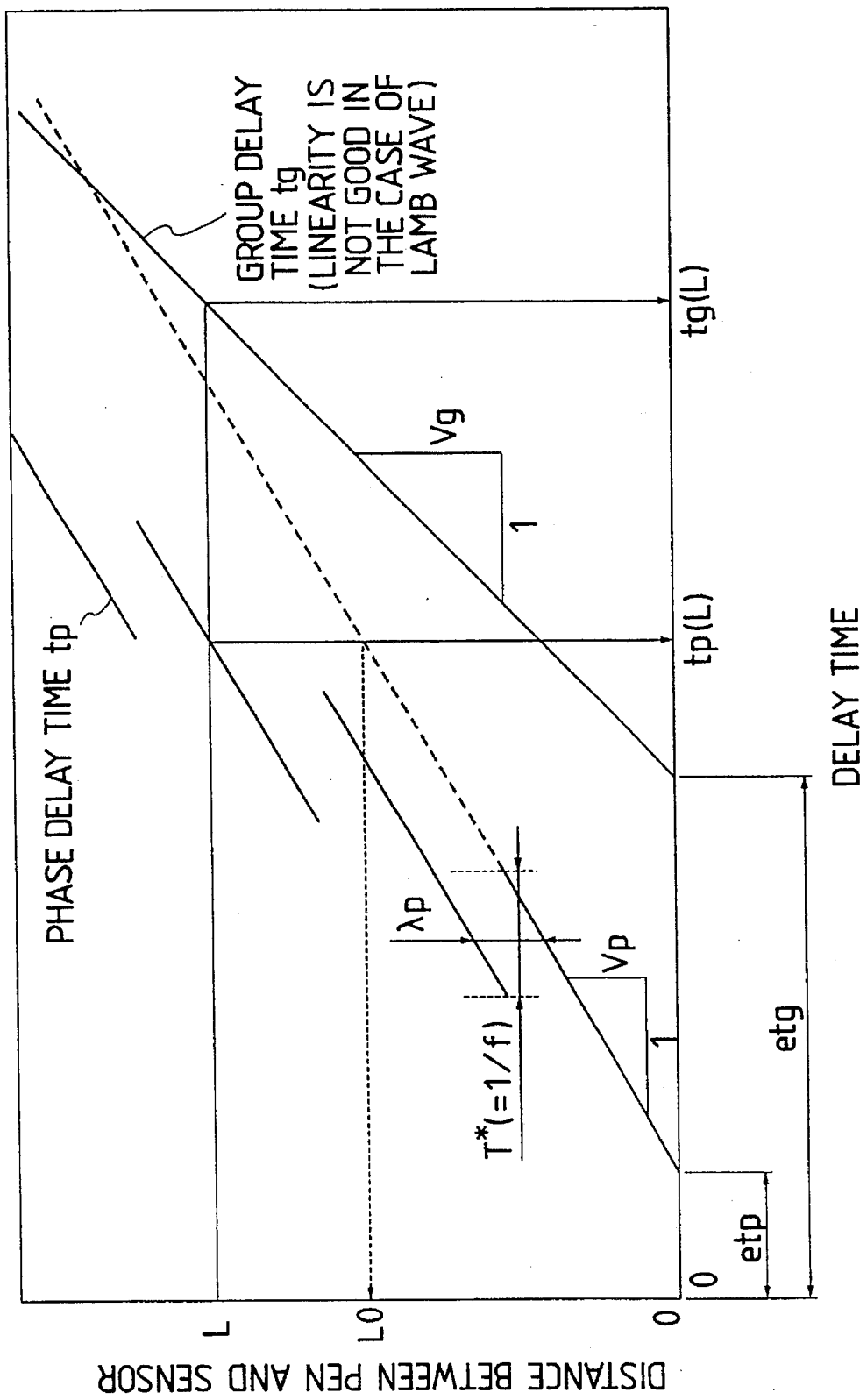
FIG. 5 is a chart showing the relationship between the delay time and the distance.

Calculation of distance between vibration source and sensor (FIG. 5).

The calculation of the distance from the vibration source to each sensor, based on thus determined group delay time tg and phase delay time tp, is conducted in the following manner. FIG. 5 schematically shows the relationship among the group delay time tg, phase delay time tp and pen-sensor distance L in the present embodiment. The relation between the group delay time tg and the distance L is continuous but is not satisfactorily linear. On the other hand, the relation between the phase delay time Tp and the distance L is sufficiently linear but not continuous, because of the difference between the group velocity Vg and the phase velocity Vp in Lamb wave.

The wave velocities (group velocity Vg, phase velocity Vp) are obtained from these relations and are defined as follows. The group velocity Vg is defined by the inclination of the relation of the distance L to the group delay time Tg, determined by first-order minimum square method. Also the phase velocity Vp is defined by determining the inclination of each straight line by first-order minimum square method and averaging the plural inclinations obtained in the distance measuring range. Also, in order to define the frequency f of the Lamb wave, the intercept of each straight line for the phase delay time tp is at first obtained by the first-order minimum square method by using the phase velocity Vp defined above, thereby obtaining the distances of these straight lines. The wavelength λ is defined by averaging the plural distances obtained in the distance measuring range, and the frequency f is defined as phase velocity Vp/wavelength λ. It will be understood that the precision of distance measurement can be optimized by calculating the distance by a method to be explained in the following, based on thus defined phase velocity Vp, group velocity Vg and frequency f.

In the following there will be explained the algorithm of distance calculation. The present embodiment employs the Lamb wave for detection, so that the linearity between the obtained group delay time tg and the distance L may not be sufficiently high. Consequently, the precision of the distance L between the vibration source 3 and the vibration sensor 6 cannot be sufficient if it is determined as the product of the group delay time tg and the group velocity Vg, as indicated in the equation (1):

$$L = Vg \cdot tg \tag{1}$$

Therefore, for the coordinate determination in more precise manner, the calculation is conducted according to the equation (2) based on the phase delay time tp of superior linearity:

$$L = Vp \cdot tp + N \cdot \lambda p \tag{2}$$

wherein λp is a wavelength of the Lamb wave, and N is an integer. In the right-hand side of the equation (2), the first term indicates a distance L0 in FIG. 6, and the difference between the desired distance L and the distance L0 is equal, as will be apparent from FIG. 5, to an integral multiple of the wavelength. (The step width T* corresponds, on the time axis, to a cycle of the signal waveform 44, so that T*= 1/frequency, or corresponds to the wavelength λp in distance.) Consequently, the pen-sensor distance L can be accurately obtained by the determination of the integer N, which can be determined by the following equation (3), based on the foregoing equations (1) and (2):

$$N = INT[(Vg \cdot tg - Vp \cdot tp)/\lambda p + 0.5] \tag{3}$$

This equation indicates that N can be accurately determined, even when the relation between the group delay time tg and the distance is not sufficient in linearity, as long as the generated error is within ±λ/2. Thus the distance L between the vibration source 3 and the vibration sensor 6 can be accurately measured by substituting thus determined N into the equation (2).

The vibration transmitting time released from the abovementioned measuring circuit contains a phase circuit delay time etp and a group circuit delay time etg (cf. FIG. 5). These times also contain, in addition to the circuit delay times, for example a time of propagation of the vibration in the contactor 5 of the vibration source 3. An error, resulting from this fact, is always present in the same amount in the transmission of the vibration from the vibration source through the vibration transmitting plate 8 to the vibration sensor 6.

Consequently, there stand following relations:

$$tg0^* = tg0 + etg \tag{4}$$

$$tp0^* = tp0 + etp \tag{5}$$

wherein tg0* and tp0* are vibration transmission times actually measured at a point of a known distance from the sensor (hereinafter the point is defined as the original point O and the known distance is defined as Ra), and tg0 and tp0 are actual transmission times of the vibration from the original point O to the sensor.

On the other hand, measured values tg*, Tp* at an arbitrary input point P can be represented by:

$$tg^* = tg + etg \tag{6}$$

$$tp^* = tp + etp \quad (7)$$

By calculating the difference between the equations (4) and (6) and that between the equations (5) and (7) there are obtained:

$$\begin{aligned} tg^* - tg0^* &= (tg + etg) - (tg0 + etg) \quad (8) \\ &= tg - tg0 \\ tp^* - tp0^* &= (tg + etp) - (tp0 + etp) \quad (9) \\ &= tp - tp0 \end{aligned}$$

In this manner it is made possible to eliminate the phase circuit delay time etp and the group circuit delay time etg contained in each transmission time and to obtain the difference of the transmission delay times. Thus, the distance from the vibration source 3 to the vibration sensor 6 can be accurately determined by calculating the distance according to the equations (1), (2) and (3), employing following values:

$$tg = tg^* - tg0^* \quad (10)$$

$$tp = tp^* - tp0^* \quad (11)$$

and finally adding, to the obtained distance, the distance Ra from the vibration sensor 6 to the original point O. It is therefore possible, by storing the distance from the vibration sensor 6 to the original point O in advance for example in an involatile memory to determine the distance from the vibration source 3 to the vibration sensor 6.

Properties of Lamb wave and error in distance measurement

The above-explained distance measuring device effects distance calculation, based on the arrival delay time of the Lamb wave, and the frequency f, group velocity Vg and phase velocity Vp of the wave. Consequently, the precision of the distance measurement depends on the accuracy of the measurement of the wave delay time, and also on the precision of setting of the constants (frequency f, group velocity Vg and phase velocity Vp of the wave) employed in the calculation.

As already known, the group velocity Vg and the phase velocity Vp of the Lamb wave depend on the product of the frequency f thereof and the plate thickness d. In general, the phase velocity Vp of the Lamb wave can be approximated by the following equation (12):

$$4RS \tanh\left(\frac{\pi f dS}{Vp}\right) - 1(1 + S^2)^2 \tanh\left(\frac{\pi f dR}{Vp}\right) = 0 \quad (12)$$

$$R = \text{sqr}\left\{1 - \left(\frac{Vp}{C_L}\right)^2\right\}$$

$$S = \text{sqr}\left\{1 - \left(\frac{Vp}{C_S}\right)^2\right\}$$

$C_L$: velocity of longitudinal wave
$C_S$: velocity of transverse wave.

On the other hand, the group velocity Vg is given by:

$$Vg = \frac{d\omega}{dk} \quad (13)$$

wherein $k = \omega/Vp$.

Figure 6:
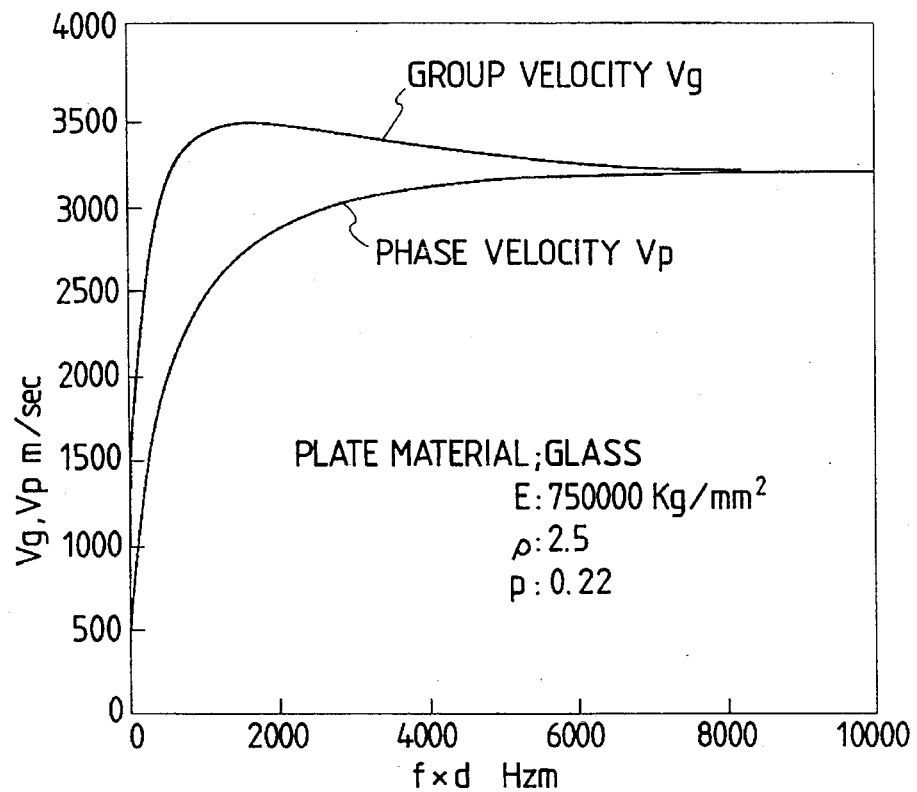
FIG. 6 is a chart showing the behavior of the velocity of the Lamb wave.

This relationship is illustrated in FIG. 6. Therefore, in the mass production of a device utilizing the Lamb wave, the wave velocity varies in each individual device because of the inevitable fluctuations of the frequency f and the plate thickness d in the components. There is therefore required means for determining the wave velocity, but the determination of the wave velocity from the distance-delay time relationship shown in FIG. 5 requires a long time and is unsuitable for mass production. (In the present case, an X-Y stage employed as the distance setting means is so controlled as to vary the distance between the vibration source 3 and the vibration sensor 6 (for example distance L=20 to 270 mm; pitch of measurement 0.2 mm), for measuring the corresponding wave arrival time.) It is therefore essential to establish means for setting the wave velocity in a simpler manner.

At first there will be explained an experiment performed for determining the actual influence of the plate thickness d and the frequency f on the wave velocity.

Figure 7:
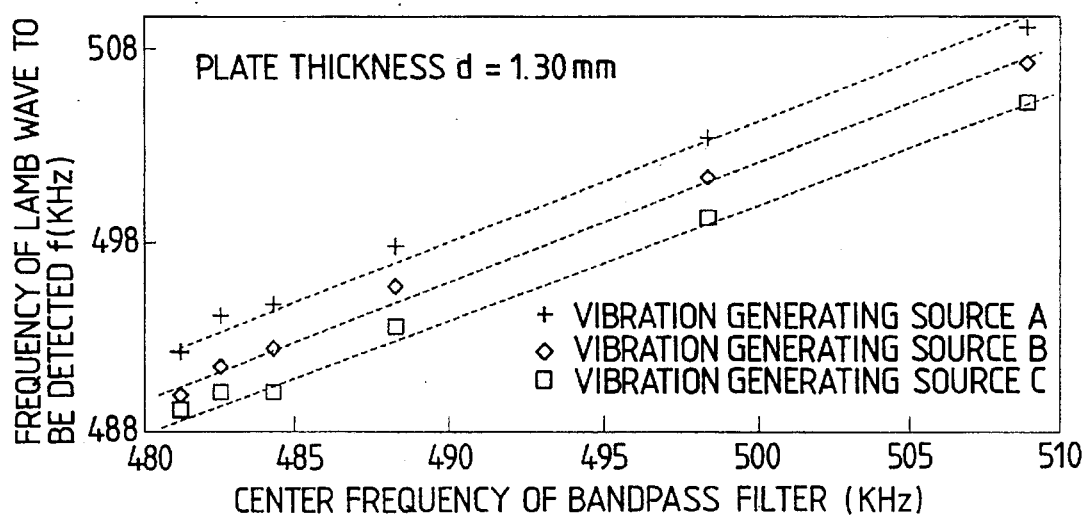
FIG. 7 is a chart showing the influence of fluctuations of components.

FIG. 7 shows the influence of the central frequency of the band-pass filter in the measuring circuit on the frequency f of the Lamb wave with the individual fluctuation of the vibration source taken as a parameter. This chart clearly indicates that the central frequency of the band-pass filter and the individual fluctuation of the vibration source affect the frequency f of the Lamb wave. Stated differently, even if the plate thickness is constant, the frequency varies depending on the circuit characteristics and the individual fluctuation of the vibration source, so that the phase velocity Vp and the group velocity Vg also vary.

Figure 8:
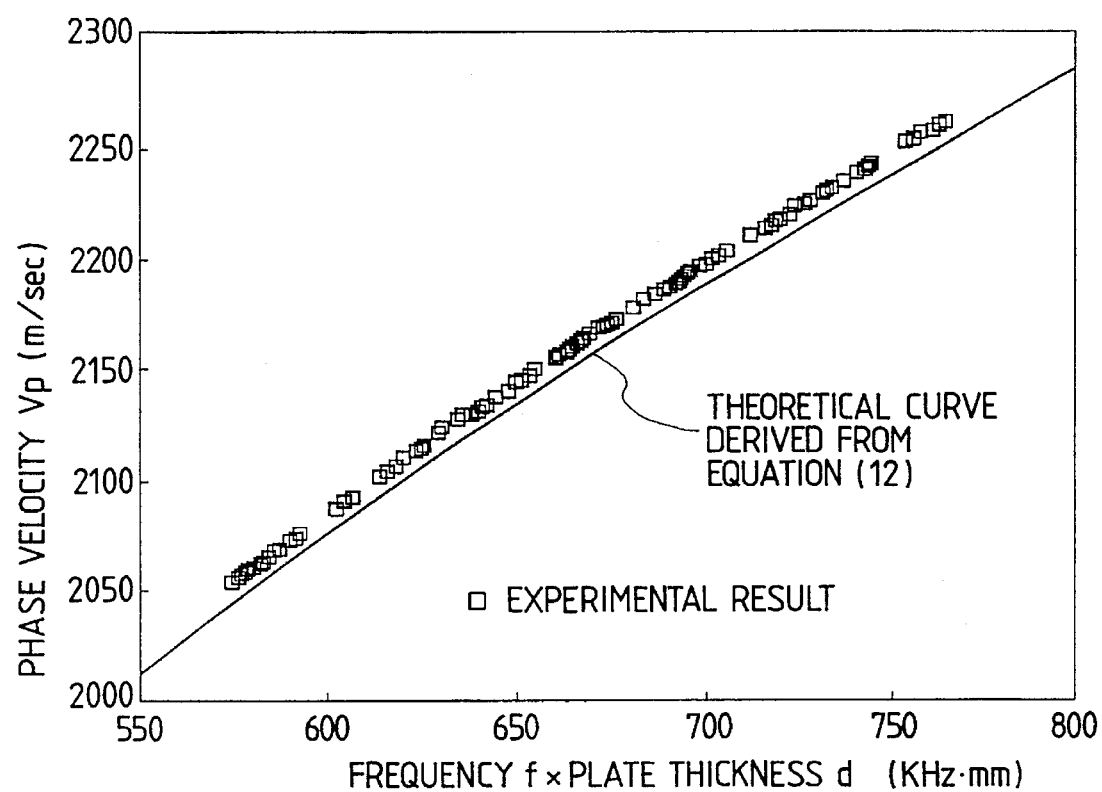
FIG. 8 is a chart showing the behavior of the phase velocity Vp.

These experimental data, together with similar ones obtained by varying the plate thickness d, can be rearranged as a relationship between the product of the frequency f and the plate thickness d, and the phase velocity Vp as shown in FIG. 8. A solid line in FIG. 8 indicates the relation obtained from the equation (12), indicating that the actual phenomenon coincides well with the equation (12). It also suggests that the phase velocity Vp can be accurately determined if the frequency f of the Lamb wave can be somehow determined, since the plate thickness d can be precisely measured in a simple manner in the mass production, for example with a laser.

Figure 9:
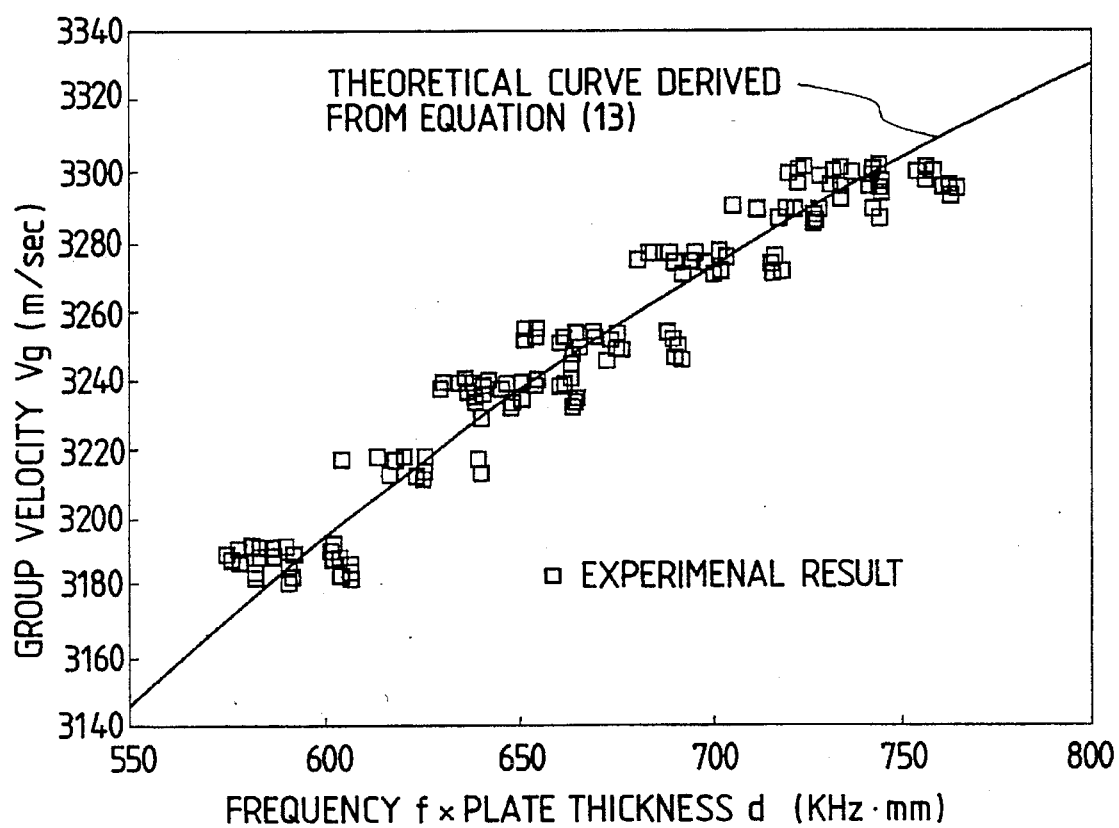
FIG. 9 is a chart showing the behavior of the group velocity Vg.

Similarly FIG. 9 shows the results rearranged for the group velocity Vg. Different from the relationship for the phase velocity Vp, the group velocity Vg cannot be determined accurately even if the frequency f of the Lamb wave and the plate thickness d can be determined. The setting error in the group velocity Vg affects the equation (3), but there exist certain tolerances for the setting errors of the group velocity Vg because the equation (3) performs half-adjusting operation during the calculation, and the integer N can be accurately calculated if the setting errors are less than the tolerances, so that the accuracy of distance calculation according to the equation (2) is not directly influenced.

Figure 10:
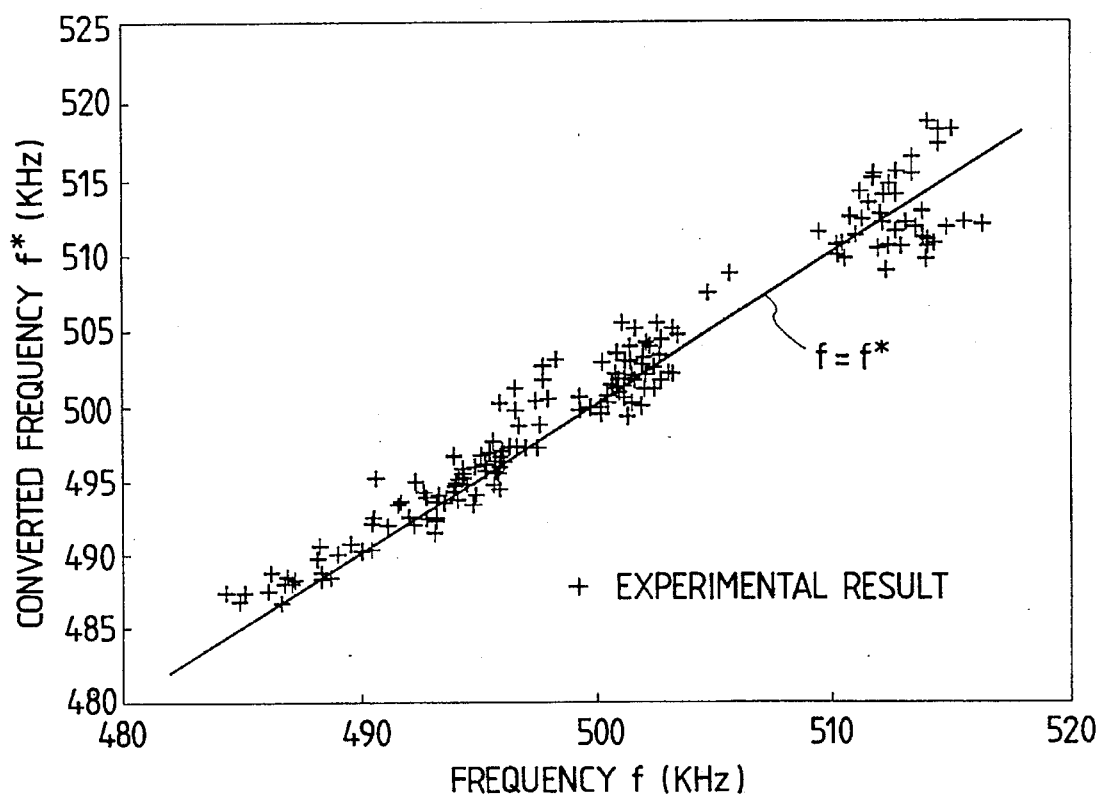
FIG. 10 is a chart showing the relationship between the frequency f and the converted frequency f*.

As explained in the foregoing, it is possible to determine the phase velocity Vp accurately and the group velocity Vg approximately if the frequency f of the Lamb wave can be determined by any method. The present embodiment is therefore so constructed as to detect the phase period and to convert the period into the frequency of the Lamb wave (hereinafter such derived value being defined as converted frequency f*). FIG. 10 shows the relationship between the converted frequency f* and the actual frequency f of the Lamb wave to be obtained. Although there exists certain correlation between the converted frequency f* and the actual frequency f of the Lamb wave, a difference of about ±5 kHz exists between the two. It is thus not possible to accurately determine the frequency f from the converted frequency f*, so that the relation in FIG. 8 cannot accurately provide the phase velocity Vp. The phase velocity Vp, determined from the relation of FIG. 8, based on the converted frequency f containing the error will be defined as the converted phase velocity Vp*, different from the correct phase velocity Vp.

Figure 11:
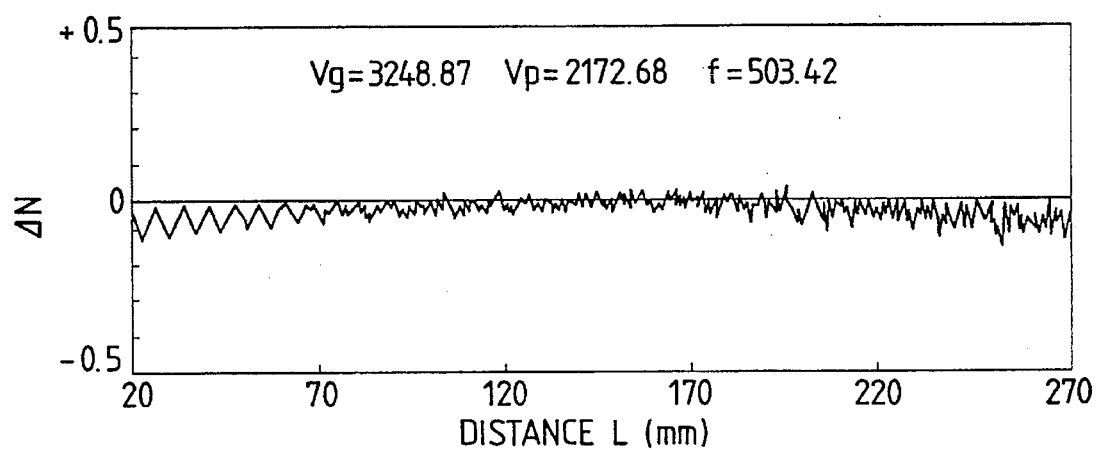
FIG. 11 is a chart showing the dependence of an error $\Delta N$ in making integer on distance.
Figure 12:
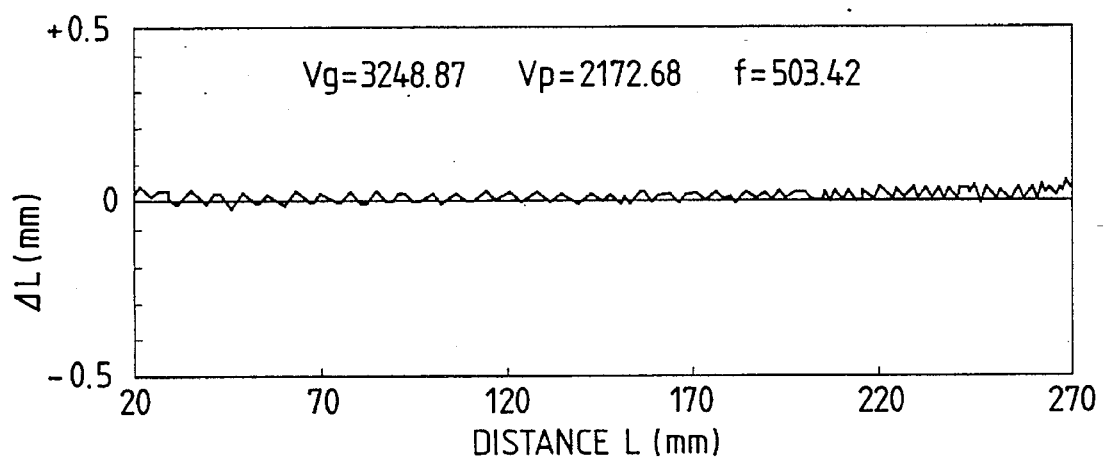
FIG. 12 is a chart showing the dependence of distance measurement precision $\Delta L$ on distance.

FIGS. 11 and 12 show the error $\Delta L$ in distance measurement and the error $\Delta N$ in making integer, of the representative data obtained from the aforementioned experiments ($\Delta N=N^*-N$ wherein $N^*=(Vgtg-Vptp)/\lambda p$, and N can be obtained from the equation (3)). The original point O in this case (the original point O being already explained in detail with reference to FIG. 5) is at a distance of 145 mm from the sensor, and the following data are all given under this condition. These results are obtained with exact constants determined from the distance-delay time relationship, and indicate that the integer N and the distance L can be precisely calculated. On the contrary, the precision of distance measurement is lowered if the setting of the wave velocity contains an error. In the following, therefore, there will be considered the influence of the error in the wave velocity measurement on the equation (2) in the case that the measurement of wave velocity contains an error. The following discussion will be based on an assumption that the influence of the setting error of the group velocity Vg on the equation (3) is within the tolerance (the integer N is exactly calculated), and the actual influence will be described later.

Figure 13:
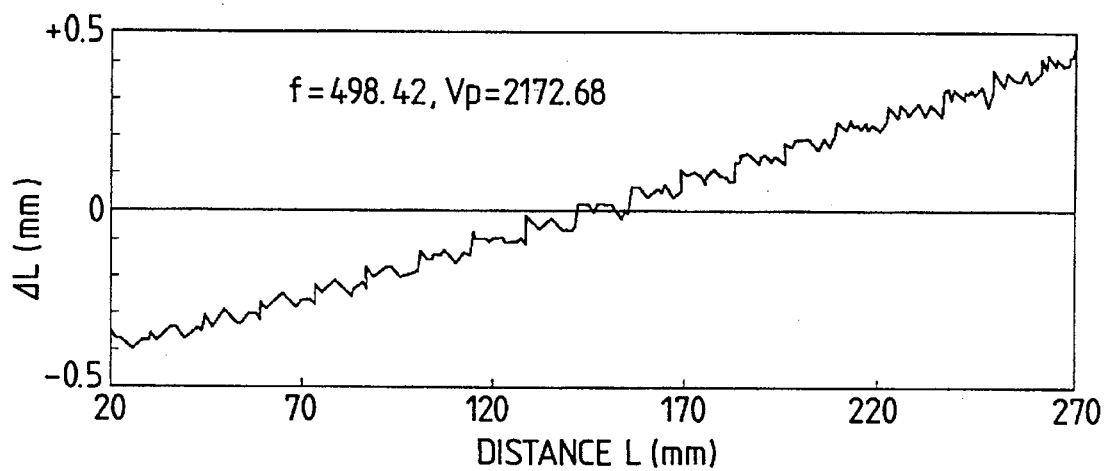
FIG. 13 is a chart showing the distance measurement error $\Delta L$ in case the frequency f contains an error.
Figure 14:
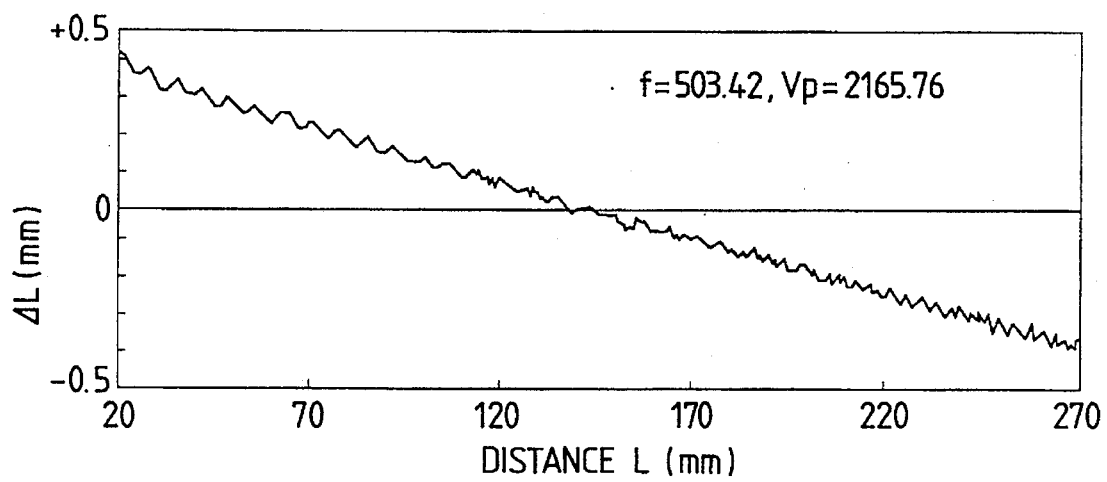
FIG. 14 is a chart showing the distance measurement error $\Delta L$ in case the phase velocity Vp contains an error.

The frequency f can only be determined with an accuracy of ±5 kHz according to the experimental results relative to the above-mentioned exact constants. Thus, FIG. 13 shows the error generated in the distance measurement in case the exact frequency with an error of −5 kHz is used as the constant. Also, FIG. 14 shows the result of calculation in the case that the frequency is calculated correctly and only the phase velocity Vp contains an error of −6.9 m/sec. These charts clearly indicate a deterioration in the precision of the distance measurement. Thus, the precision cannot be improved unless the constants relating to the wave velocity are correctly set in each individual device.

The phenomenon in FIG. 13 will be explained by FIG. 15. The actually measured delay time is indicated by solid lines while the delay time determined by the set constants is represented by broken lines. Because only the frequency f contains an error, both lines have a same inclination, and the precision of distance measurement becomes deteriorated as the distance from the original point increases.

Figure 15:
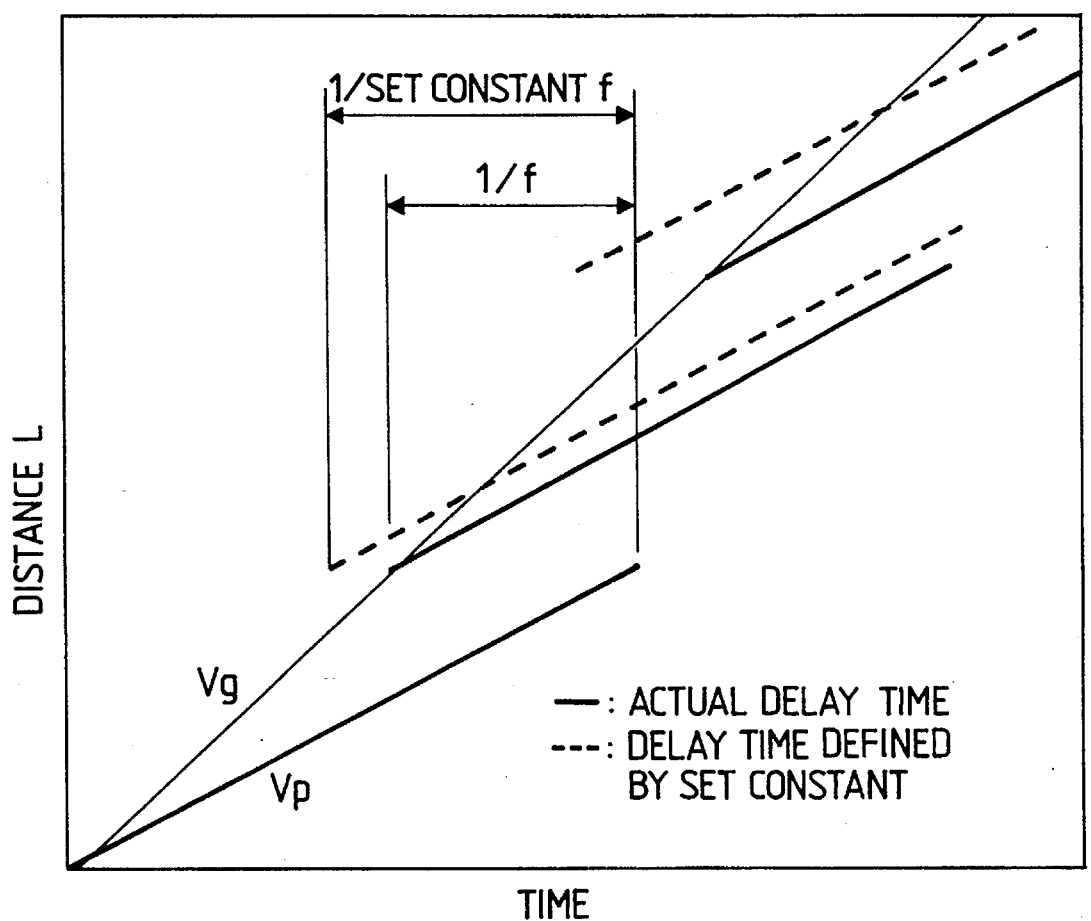
FIG. 15 is a chart showing the cause of phenomenon shown in FIG. 13.

The determination of the frequency f in the aforementioned manner cannot provide sufficient precision, and even if the phase velocity Vp can be correctly determined, the precise distance calculation is impossible because of the relation shown in FIG. 15. It should, however, be possible to reduce the error $\Delta L$ of distance measurement by correcting the phase velocity Vp as shown in FIG. 16 with respect to the error-containing frequency.

Figure 16:
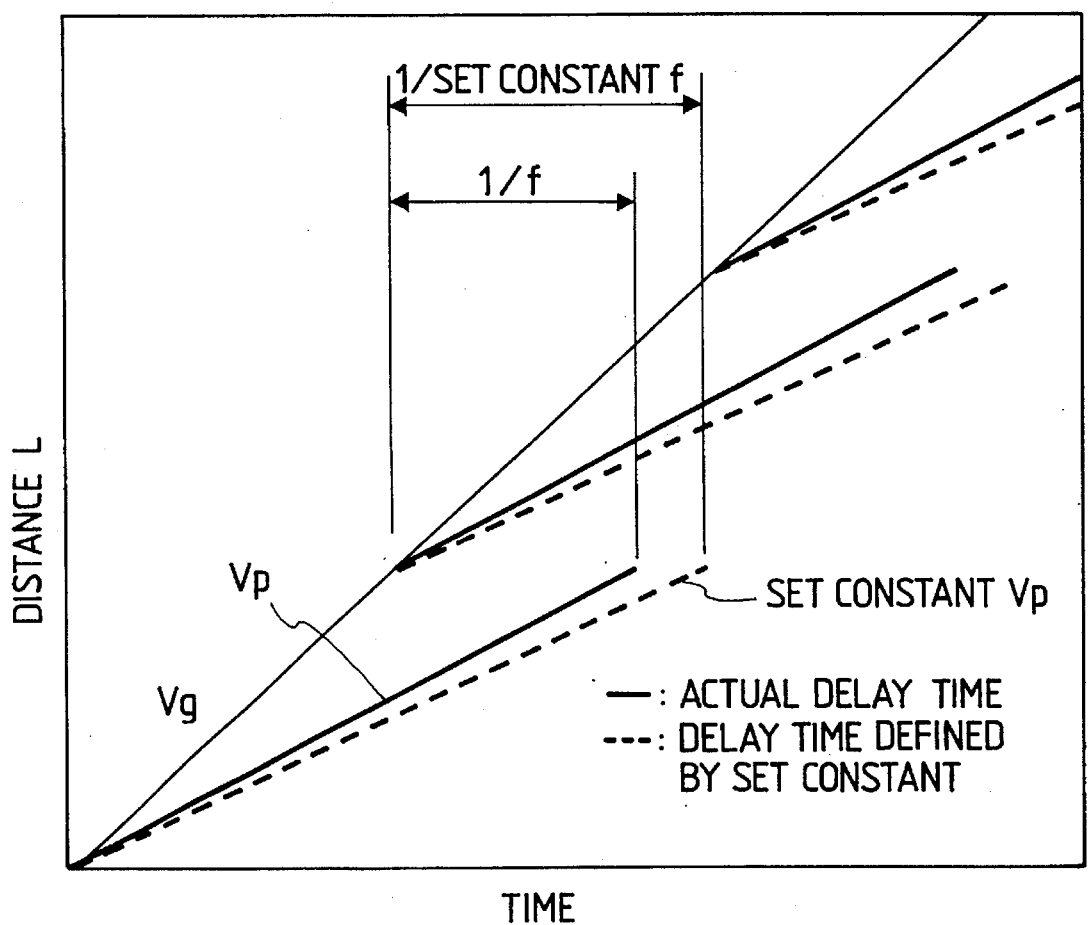
FIGS. 16 and 17 are views showing the method of correction of set constants.

It is in fact possible to obtain the relationship as shown in FIG. 16, thereby reducing the error in distance measurement, by setting the phase velocity Vp larger or smaller than the actual value respectively if the frequency used as the constant is set higher or lower than the frequency f of the Lamb wave. Consequently, the properties of the Lamb wave has been investigated for the purpose of correcting the phase velocity Vp.

Figure 17:
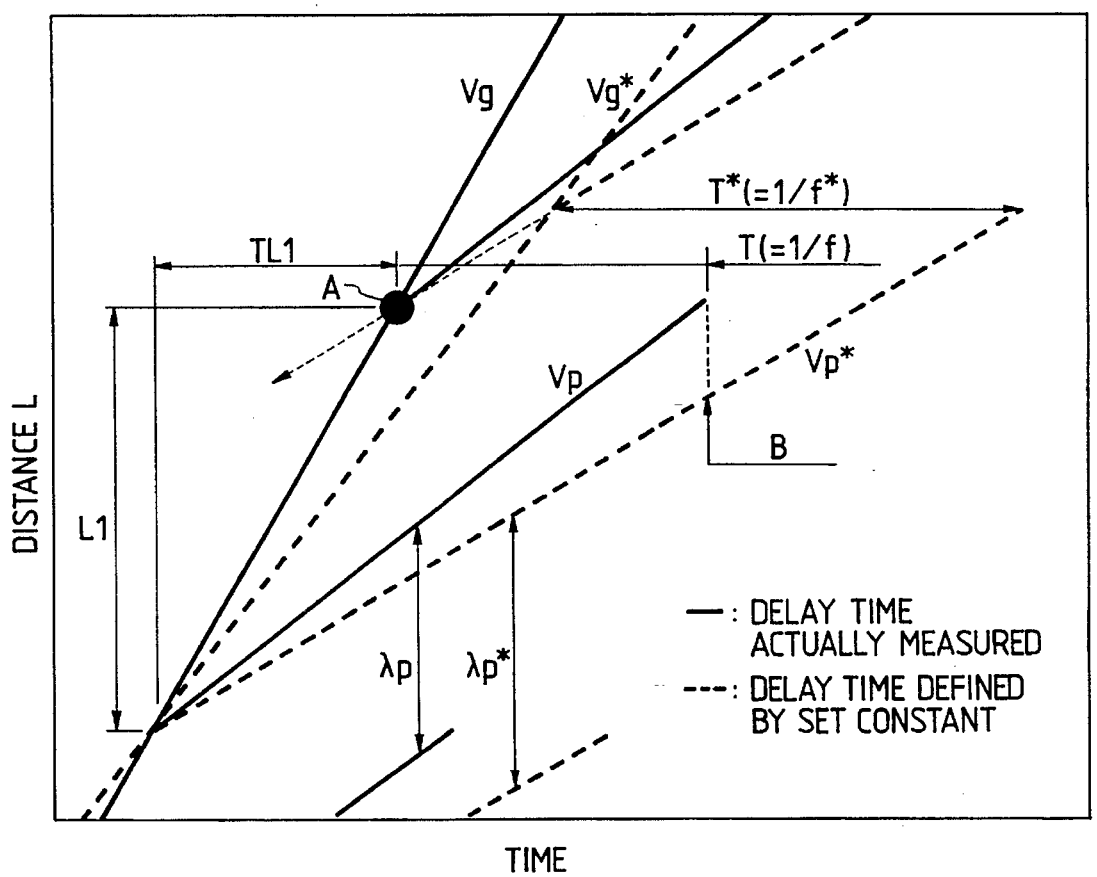

FIG. 17 schematically shows the relationship between the delay time obtained in the present measuring system and the distance, for given plate thickness and frequency. The phase delay time Tp becomes stepwise as already explained before, and, by defining its repeating interval as TL1 in time or L1 in distance, there are obtained:

$$L1=Vg\cdot TL1=Vp(TL1+1/f) \quad (14)$$

$$\therefore TL1=Vp/f(Vg-Vp) \quad (15)$$

$$\therefore L1=VgVp/f(Vg-Vp) \quad (16)$$

Figure 18:
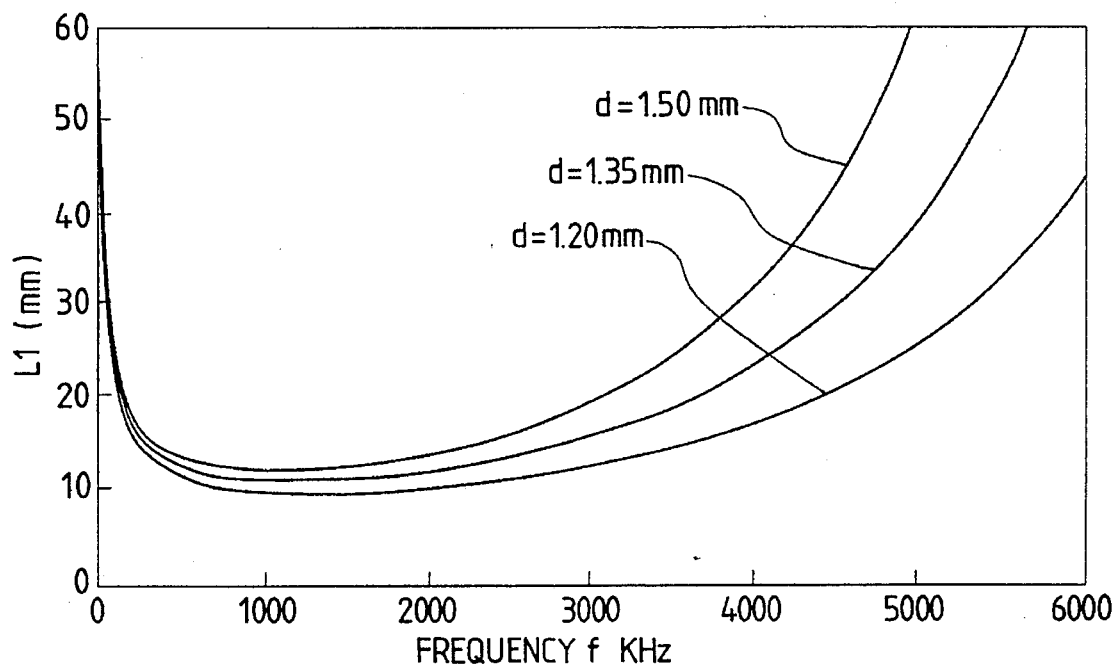
FIG. 18 is a chart showing the dependence of distance L1 on the frequency.

The relationship between the distance L1 and the frequency (group velocity Vg and phase velocity Vp being obtained respectively from the equations (12) and (13), based on the frequency f and the plate thickness d) is shown in FIG. 18. In the low-frequency region, if the frequency is assumed to have become lower by $\Delta f$ with respect to the delay time of the Lamb wave shown in FIG. 17, there can be obtained brokenlined states shown in FIG. 17, since the phase velocity Vp and the group velocity Vg become lower and the distance L1 becomes larger according to the equations (12) and (13). In this state, if the extrapolation of the broken line passes the point A, there stands the relation represented by the equation (16), the distance calculation can be correctly executed, without the actual frequency and phase velocity of the Lamb wave, by employing the converted frequency f* containing a deviation $\Delta f$ and the converted phase velocity Vp* obtained from the converted frequency and the equation (12) (or an experimentally obtained relation as shown in FIG. 8). The necessary condition for this relation is given by:

$$L1=TL1\cdot Vp^*+Vp^*/f^* \quad (17)$$

Therefore, from the equations (15) and (16), there can be obtained:

$$Vp(Vg-Vp^*)/f(Vg-Vp)-Vp^*/f^*=0 \quad (18)$$

If the plate thickness is constant, the group velocity and the phase velocity are functions of the frequency f. Thus a function G(f) is defined as follows:

$$G(f)=Vp(Vg-Vp^*)/f(Vg-Vp)-Vp^*/f^* \quad (19)$$

Also, the phase velocity Vp is approximated by the following equations, within a small section of frequency f:

$$Vp=\alpha fd+\beta \text{(Plate thickness: constant)} \quad (20)$$

$$Vp^*=\alpha(f+\Delta f)d+\beta \quad (21)$$

$\alpha$ can be obtained by differentiating the equation (12) with the frequency f. Since there is employed a Lamb wave having different Vg and Vp, the equation (19) can be rewritten as:

$$G(f) = \frac{\beta(Vg - Vp) - \alpha(f + \Delta f)dVp}{f(f + \Delta f)(Vg - Vp)} \Delta f \approx 0 \quad (22)$$

Consequently, if the necessary condition equation (18) is satisfied, the distance calculation can be correctly conducted without the actual wave velocity by employing the approximate frequency f* of the Lamb wave and the converted phase velocity Vp* determined from the frequency f* and the equation (12).

Figure 19:
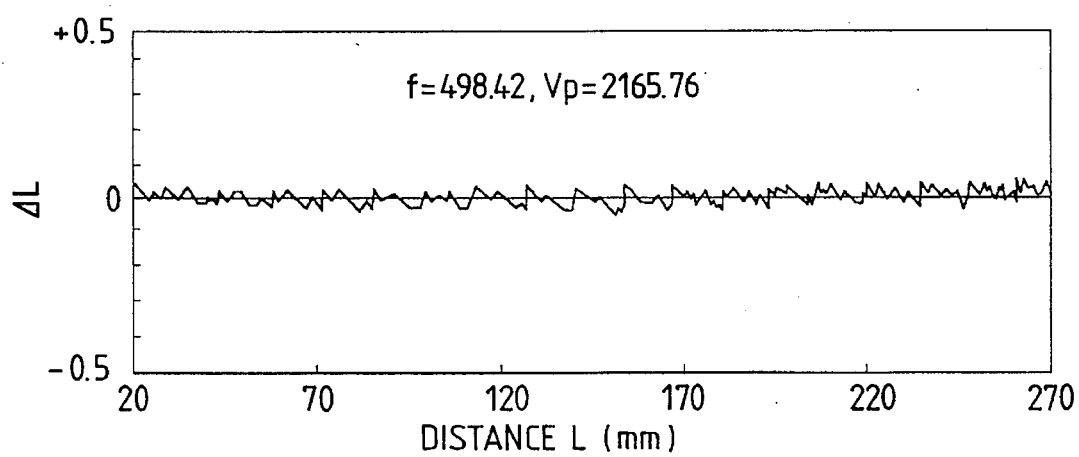
FIG. 19 is a chart showing the distance measurement error $\Delta L$ in calculation with corrected (approximate) constants.

FIG. 19 shows an example of wave velocity setting utilizing the above-mentioned relation. As the frequency f can only be measured with an accuracy of ±5 kHz as shown in FIG. 10, the calculation was conducted with a frequency of 498.42 kHz (corresponding to the converted frequency f*) in contrast to the actual frequency f=503.42 kHz, and a converted phase velocity Vp*=2165.76 m/sec (actual phase velocity Vp=2172.68 m/sec with a difference $\Delta Vp=-6.9$ m/sec) derived from the converted frequency f* and the relation shown in FIG. 8. In comparison with the results shown in FIG. 13 (containing an error of −5 kHz only in the frequency f) and FIG. 14 (containing an error of −6.9 m/sec only in the phase velocity Vp), the result in FIG. 19 represents a significant improvement in the precision of the distance measurement, thus becoming substantially equivalent to the result employing the actual wave velocity as shown in FIG. 12.

There has been explained that the distance calculation can be conducted even with an approximate wave velocity, owing to the distance calculating algorithm utilizing the Lamb wave, and the properties of the Lamb wave. The error generated in the distance calculation becomes largest at a point B in FIG. 17 where the distance between the solid line and the broken line becomes maximum. Consequently, the anticipated error ΔLmax in the distance measurement is given by:

$$\Delta L_{max} = L1(Vp^* - Vp)/Vp \quad (23)$$

The equation (23) indicates that the precision of distance measurement can be improved by a more accurate setting of the wave velocity (state of Vp*=Vp), and also indicates that the influence of the error in the wave velocity setting can be reduced by decreasing the distance L1. FIG. 18 shows that the distance L1 is dependent on the frequency and the plate thickness, and that there is a particular frequency range in which the distance L1 becomes minimum. Therefore, the influence of the error in the wave velocity setting can be reduced by setting the frequency f and the plate thickness d so as to minimize the distance L1. In case the plate is composed of glass as in the present embodiment with a thickness d within a range of 1.20 to 1.50 mm, it has been shown that the optimum frequency is within a range of about 500 kHz to 2000 kHz.

In the foregoing there has been explained that exact distance calculation can be executed with the approximate converted frequency determined from the phase period of the detected signal waveform and the converted phase velocity Vp* from the converted frequency and the relation shown in FIG. 8. In the following there will be described the influence on the equation (3) when approximate constants are employed.

Figure 20:
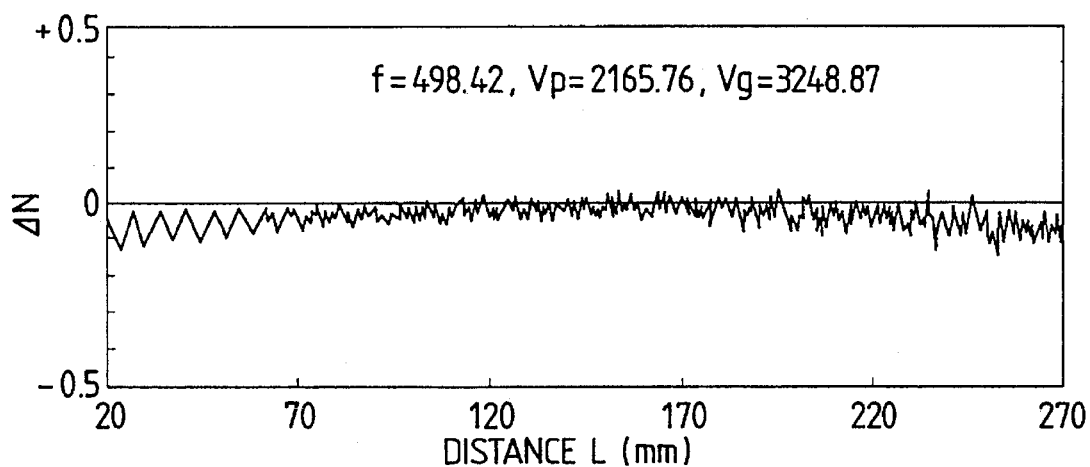
FIG. 20 is a chart showing the error $\Delta N$ in making integer, in calculation with corrected (approximate) constants.

FIG. 11 indicates that ΔN does not exceed 0.1 in the case of using the exact wave velocity, so that the integer N can be exactly determined from the equation (3). FIG. 20 shows the influence on the equation (3) in case the frequency and the phase velocity are set as explained above, assuming that the group velocity can be correctly determined. It will be understood that this result is almost same as that shown in FIG. 11, so that the integer N can be determined without difficulty by the above-mentioned setting of the frequency and the phase velocity. Therefore, the calculation of the integer N can be realized without problem by the setting of the phase velocity Vp and the frequency f according to the above-explained method.

Figure 21:
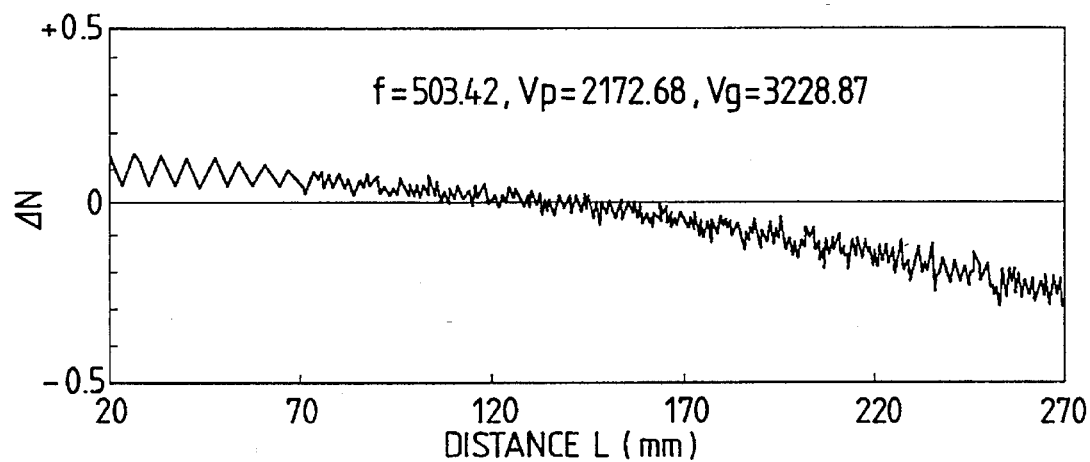
FIG. 21 is a chart showing the error $\Delta N$ in making integer, in case the group velocity Vg contains a setting error of $-20$ m/sec.
Figure 22:
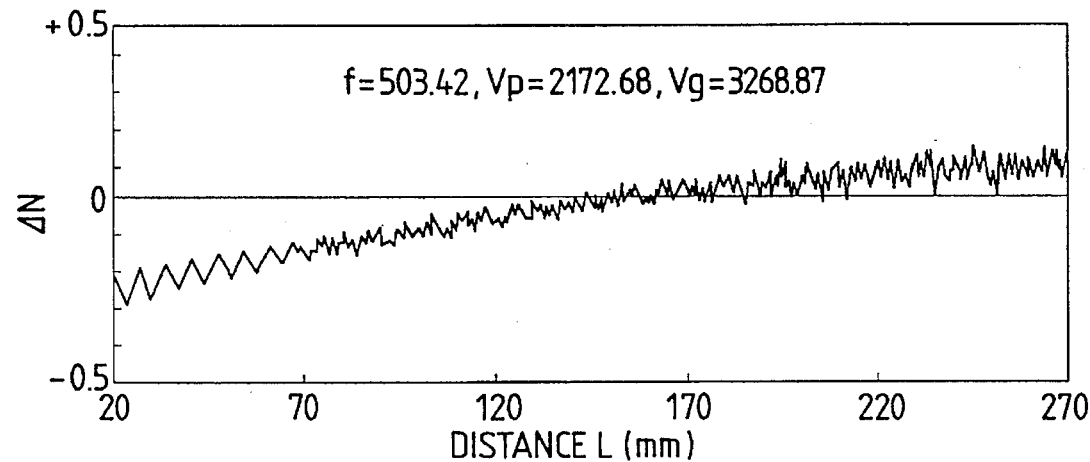
FIG. 22 is a chart showing the error $\Delta N$ in making integer, in case the group velocity Vg contains a setting error of $+20$ m/sec.

In the following there will be described the setting error of the group velocity Vg, based on the foregoing results. The group velocity Vg is set with a considerable error, not only because the measurement of the converted frequency contains an error but also because the correlation between the product of the frequency and the plate thickness and the group velocity Vg as shown in FIG. 9. If the maximum error anticipated by the present constant setting method is assumed to be about 20 m/sec and is contained in the setting of the group velocity in the calculation, there will be obtained a result as shown in FIG. 21 (with a setting error of −20 m/sec in the group velocity Vg) or in FIG. 22 (with a setting error of +20 m/sec in the group velocity Vg). Since the integer N can be correctly calculated if ΔN is within a range of ±0.5, accurate determination of the integer N can be achieved even with the approximate group velocity Vg. Therefore, in the present embodiment, the precision of distance measurement is never deteriorated by the setting error of the group velocity Vg.

Second Embodiment

Figure 23:
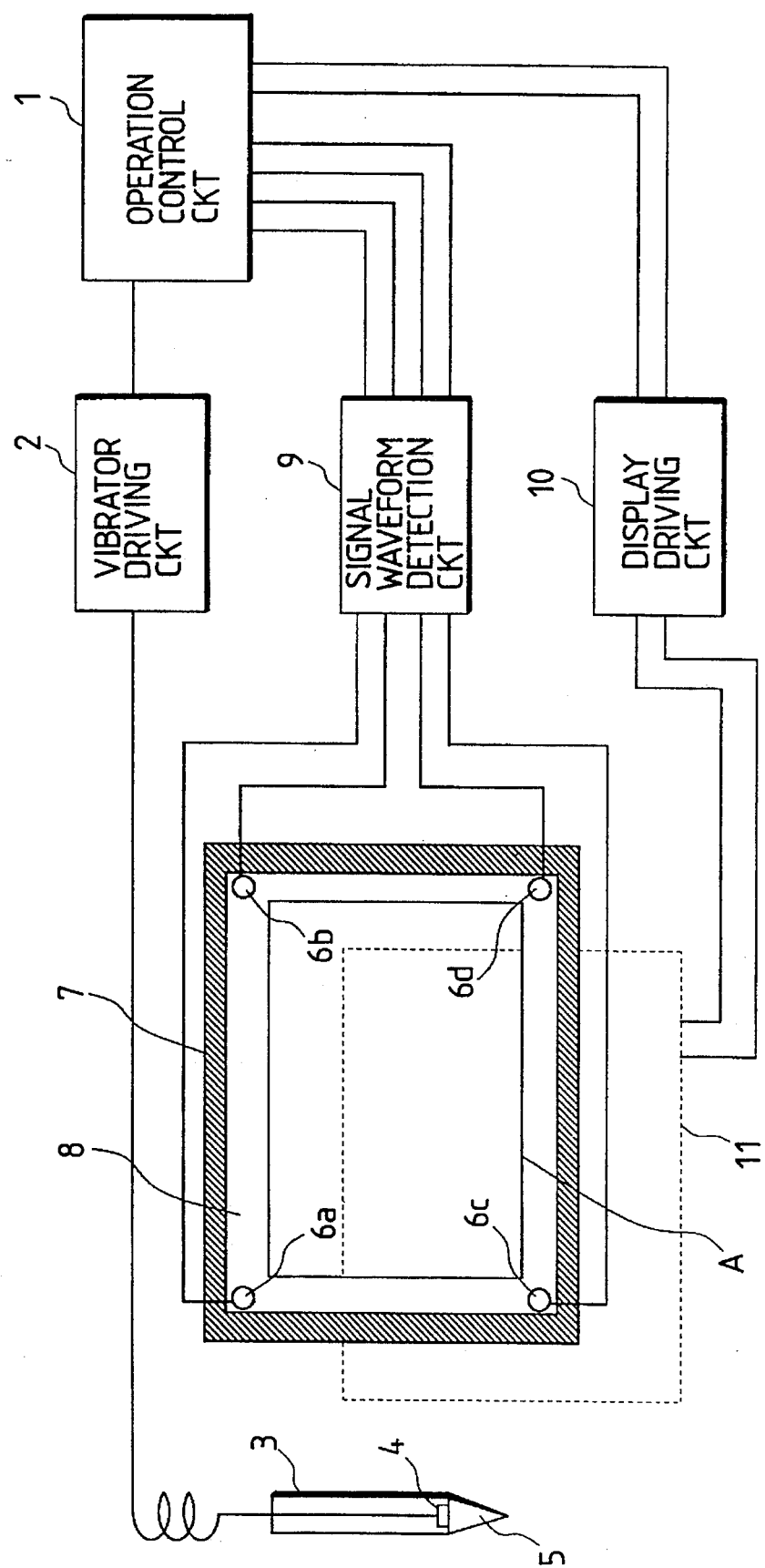
FIG. 23 is a block diagram showing the principal configuration of a coordinate input apparatus.
Figure 24:
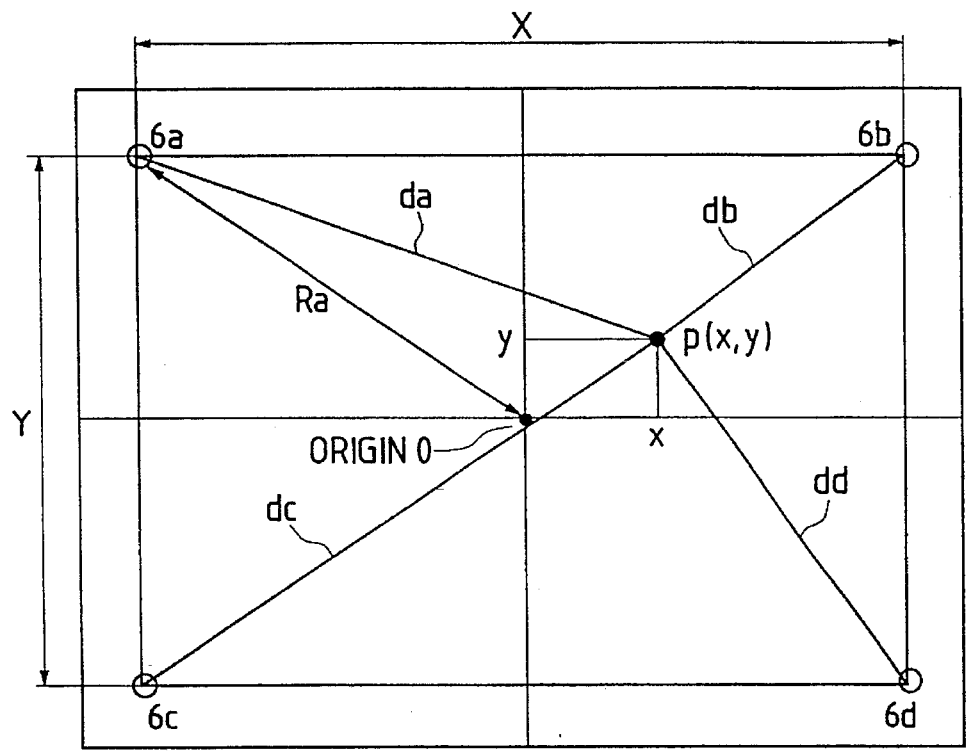
FIG. 24 is a schematic view showing the principle of position calculation.

FIG. 23 shows the configuration of a coordinate input device in which the above-explained distance measuring device is applied. In FIG. 23, components equivalent in function to those in the first embodiment are represented by same numbers. An operation control circuit 1 controls the entire device and calculates the coordinate position. A vibrator driving circuit 2 causes vibration of a vibrator 4 incorporated in a vibration source 3, and causes the generated vibration to be transmitted to a vibration transmitting plate 8 through a contactor 5. The vibration transmitting plate 8 is composed, in the present embodiment of a glass plate, and the coordinate input by the vibration source 3 is achieved by the contact thereof in a coordinate input effective area (hereinafter called effective area, and corresponding to an area A indicated by solid lines in FIG. 26) on the vibration transmitting plate 8. On the outer perimeter of the vibration transmitting plate 8, there is provided an antivibration material 7 in order to prevent that the vibration entered by the vibration source 3 is reflected at the end face of the plate 8 toward the central part thereof. In the peripheral part of the vibration transmitting plate 8, there are fixed vibration sensors 6a to 6d such as piezoelectric elements, for converting the mechanical vibration into electrical signals. The signals from the sensors are amplified in unrepresented amplifier circuits, and then supplied to a signal waveform detection circuit 9 for signal processing, of which result is supplied to the operation control circuit 1 for coordinate calculation. The details of the signal detection circuit 9 and operation control circuit 1 will be explained later. A display 11, such as a liquid crystal display unit, capable of display in dot units, is provided behind the vibration transmitting plate 8 and displays, under the control of a display driving circuit 10, a dot in a position contacted by the vibration source 3, the display being observable through the vibration transmitting plate 8 (in case it is translucent).

This coordinate input device calculates the distance from the vibration source to each sensor by means of the distance measuring device explained above, and determines the position of the vibration source based on these results.

Figure 27:
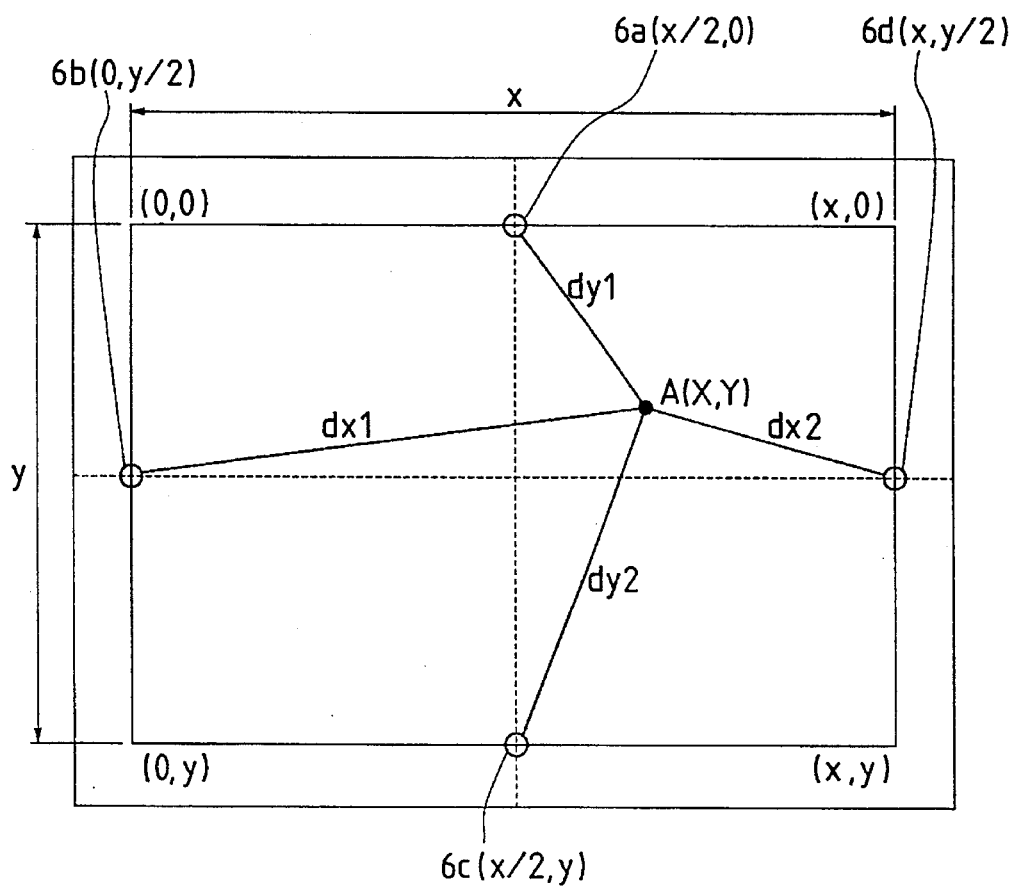
FIG. 27 is a schematic view showing a fourth embodiment.

When four vibration sensors 6a to 6d are positioned at the four corners S1 to S4 on the vibration transmitting plate 8 as shown in FIG. 27, the linear distances da–dd from the position P of the vibration source 3 to the positions of said vibration sensors 6a to 6d can be determined according to the principle explained before. Then the operation control circuit 1 determines the coordinate (x, y) of the point P of the vibration source 3 from the linear distances da to dd, according to the following equations:

$$x = (da+db) \cdot (da-db)/2X \quad (24)$$

$$y = (da+dc) \cdot (da-dc)/2Y \quad (25)$$

wherein X is the distance between the vibration sensors 6a and 6b, while Y is the distance between the vibration sensors 6c and 6d. In this manner the coordinate of the position of the vibration source 3 can be detected on real-time basis.

The above-explained calculation is conducted with the distance information to three sensors, and the distance information of the remaining vibration sensor among four sensors employed in the present embodiment is used for confirming the certainty of the obtained coordinate. It is naturally possible to omit the distance information of the sensor of the largest pen-sensor distance L (an increased distance reduces the detected signal level, whereby the probability of influence of noises becomes larger), and to calculate the coordinate by the remaining three sensors. The present embodiment employs four sensors of which three are used for coordinate calculation, but, geometrically, the coordinate calculation is possible with two sensors at minimum. Thus the number of sensors is to be determined according to the specification of the product.

Third Embodiment

Figure 25:
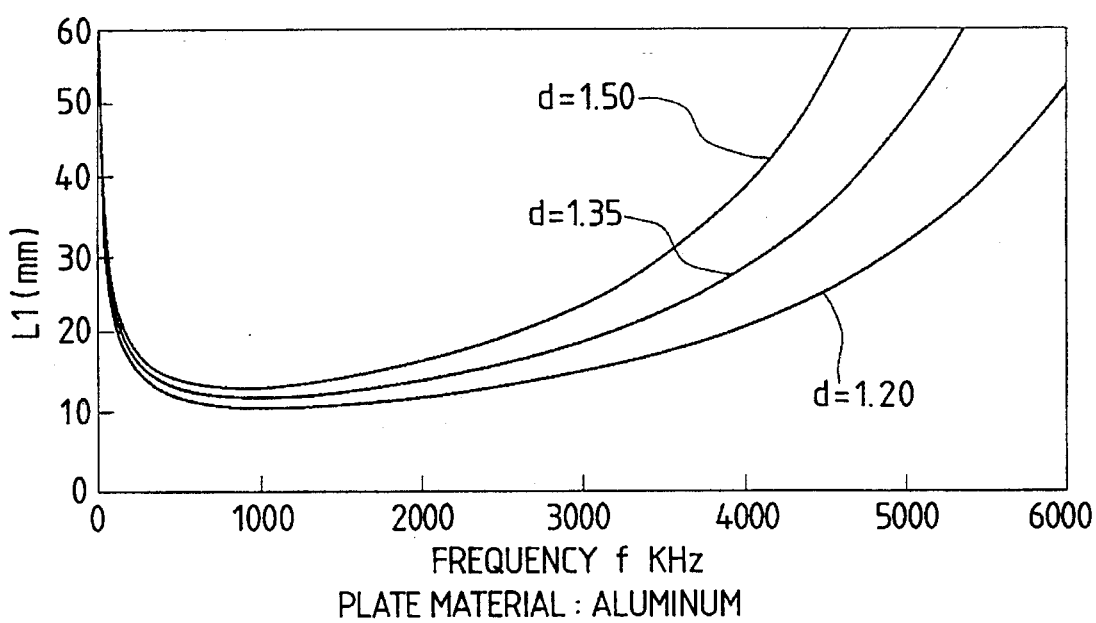
FIG. 25 is a chart showing the relationship of the distance L1 in case the plate is composed of aluminum.
Figure 26:
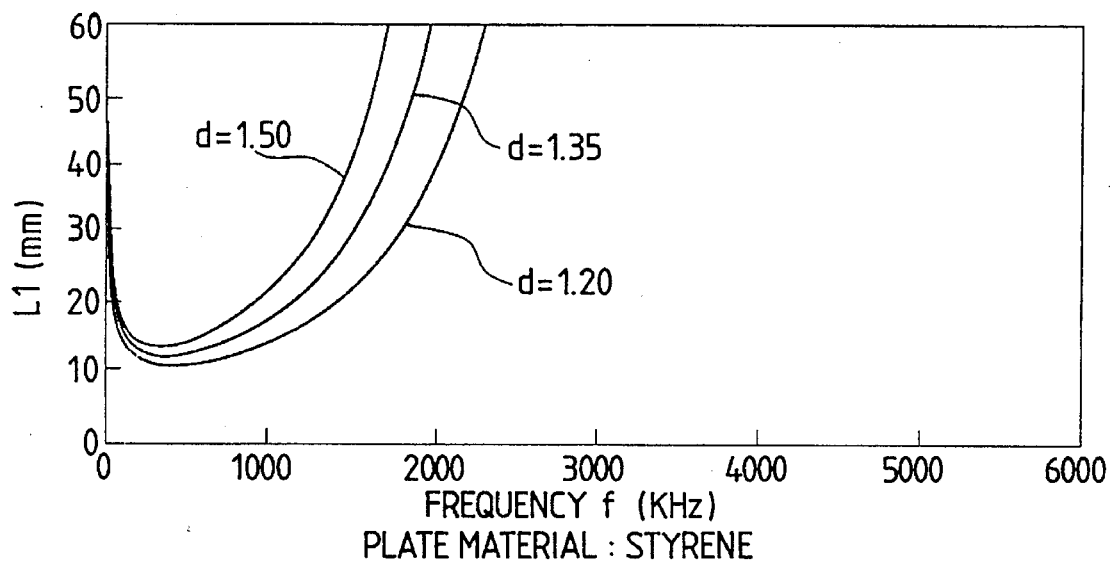
FIG. 26 is a chart showing the relationship of the distance L1 in case the plate is composed of polystyrene.

FIGS. 25 and 26 shows the value L1 respectively in case the plate is composed of aluminum or polystyrene, and indicate a fact that the characteristics are different in comparison with the case of glass (FIG. 18). Aluminum, being relatively similar to glass in acoustic properties, provides a result similar to that of glass, but polystyrene shows a significant change in the L1 because of the difference in the physical properties. FIG. 26 indicates, in case of polystyrene, that value L1 becomes small in a frequency range of several hundred kHz for a plate thickness d of 1.20 to 1.50 mm.

Thus, the present invention is not featured by a frequency range, but by a combination of the material of the plate, the thickness thereof and the frequency of the Lamb wave. As explained before, L1 is given by:

$$G(f, d) = L1 = VgVp/\{f(Vg-Vp)\}$$

Also the group velocity Vg and the phase velocity Vp of the Lamb wave depend on the material constituting the plate and the product fd of the plate thickness d and the frequency f. It will therefore be understood that the value L1 also depends on these values. Also for any material constituting the plate, there exists a range where the value L1 becomes minimum. Stated differently, the function G(f, d) is convex toward below, and the error in the distance measurement generated by the use of approximate constants becomes smaller as the value of said function G becomes smaller. Consequently the present invention is featured by the setting of the plate material, the plate thickness and the frequency of the Lamb wave so as to minimize the value L1, and such setting enables precise distance calculation even with the approximate wave velocity and dispenses with the determination of the accurate wave velocity. Thus, there can be provided an inexpensive device excellent in mass producibility, even utilizing the Lamb wave, which requires wave velocity determination in each individual device, for detection.

Fourth Embodiment

The first or second embodiment is to calculate the distance or the coordinate position, by detecting the phase delay time tp and the group delay time tg of the Lamb wave. In contrast, the present embodiment provides a similar effect by detecting the phase delay time only and calculating the distance or the coordinate position, employing the frequency f of the Lamb wave and the phase velocity Vp as the set constants in the calculation. More specifically, in contrast to the foregoing embodiments in which the integer N is calculated by the equation (3), if the integer N can be determined in another method, it no longer is necessary to measure the group delay time tg so that the group velocity Vg can be dropped from the constants.

Figure 28:
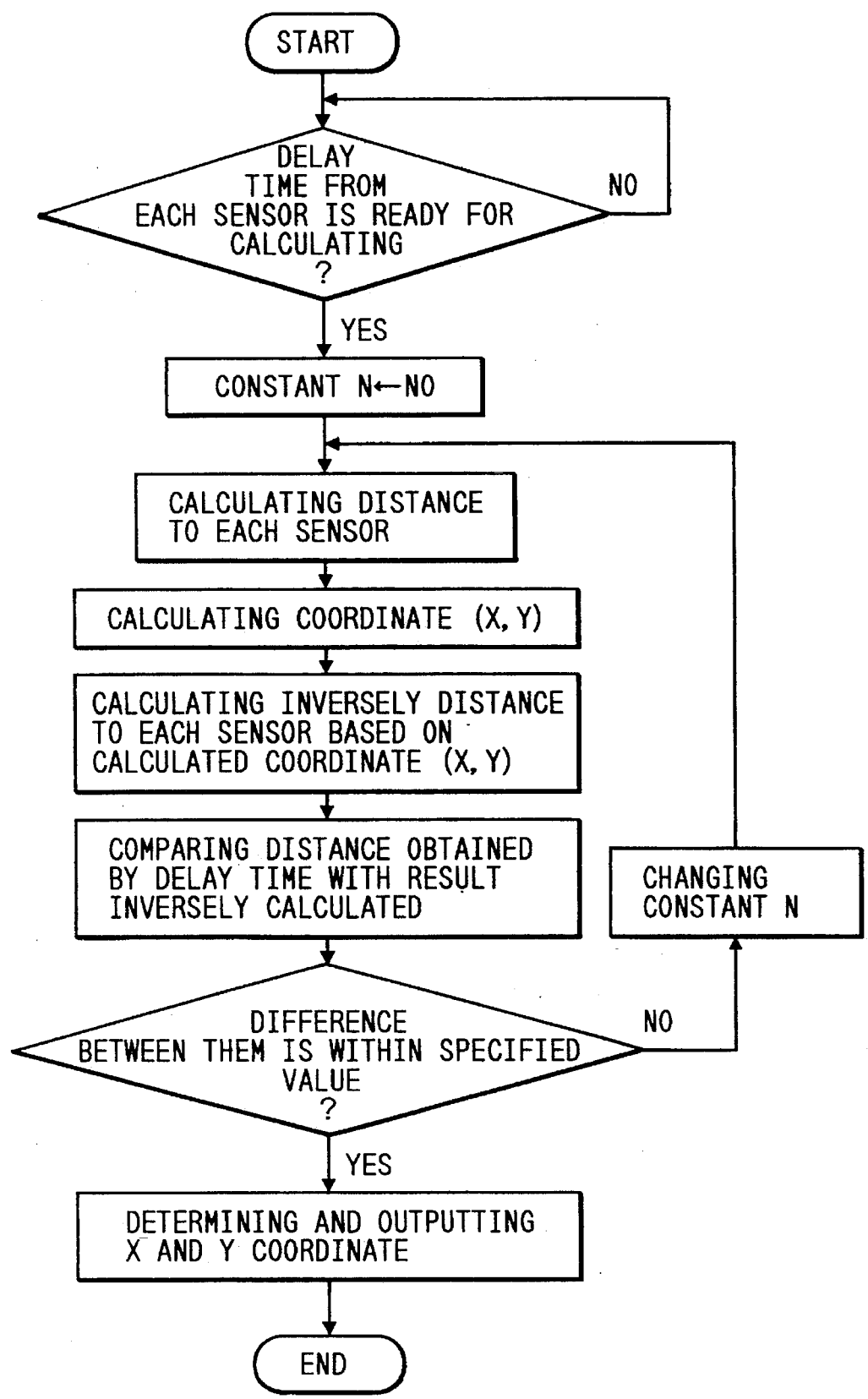
FIG. 28 is a flow chart showing the sequence of distance calculation in the fourth embodiment.

More specifically, FIG. 27 is a schematic view showing another method of coordinate calculation in the second embodiment, wherein four vibration sensors 6 are used for coordinate calculation. Let us consider a case of obtaining the coordinate value of a point A designated by the vibration input pen 3. Distances dY1, dY2, dX1 and dX2 are respectively defined between the point A and a Y1 vibration sensor, a Y2 vibration sensor, an X1 vibration sensor and an X2 vibration sensor. Also a coordinate system is defined as shown in FIG. 27, with a distance y between the Y1 and Y2 vibration sensors and a distance x between the X1 and X2 vibration sensors. The coordinate value A(X, Y) is determined according to a procedure shown in FIG. 28.

At first the distance between the vibration sensor 6 and the vibration input pen 3 (corresponding to the first term of the equation (2)) is tentatively calculated, utilizing the phase delay time obtained by the microcomputer 31 and the already known phase velocity. As the second term of the equation (2) cannot be determined in this state, a tentative initial value n0 (integer) is substituted in the equation (2). Said tentative initial value n0 and the measured delay time tp are used for calculating the distances LY1, LY2 to the Y1 and Y2 sensors, and said distances are used for calculating the Y-coordinate value (equation (26)). Similarly the X-coordinate value is calculated by the distances LX1, LX2 to the X1 and X2 sensors (equation (27)):

$$Y = y/2 + (LY1+LY2)(LY1-LY2)/2y \quad (26)$$

$$X = x/2 + (LX1+LX2)(LX1-LX2)/2x \quad (27)$$

These X and Y values are mutually independent, because they are obtained from the vibration sensors of different combinations. Consequently the distances to the vibration sensors, inversely calculated from these tentative coordinate values (X, Y) according to the following equations (28) to (31), do not necessarily coincide with the distances calculated with the phase delay time tp and the initial value n0, because the second term of the equation (2) is not yet fixed:

$$RLY1 = sqr\{(X-x/2)^2 + Y^2\} \quad (28)$$

$$RLY2 = sqr\{(X-x/2)^2 + (Y-y)^2\} \quad (29)$$

$$RLX1 = sqr\{X^2 + (Y-y/2)^2\} \quad (30)$$

$$RLX2 = sqr\{(X-x)^2 + (Y-y/2)^2\} \quad (31)$$

RLY1: reverse calculated distance to Y1 sensor
RLY2: reverse calculated distance to Y2 sensor
RLX1: reverse calculated distance to X1 sensor
RLX2: reverse calculated distance to X2 sensor.

The present coordinate input device compares the reverse-calculated distances RLY1, RLY2, RLX1, RLX2 respectively with LY1, LY2, LX1, LX2, and, only in case of respective coincidences, it releases the tentative coordinate values (X, Y) as the firm coordinate values. In the absence of such respective coincidences, an integer is added to or subtracted from the initial value n0 (for example by addition of a length of a wavelength to LY1, corresponding to the addition of 1 to n0), and the above-explained calculation is conducted with such new value of LY1. In this manner the integer N is determined for each vibration sensor, by repeating the above-explained calculation by varying the integer n or the combination of integers n until respective coincidences are obtained between RLY1, RLY2, RLX1, RLX2 and LY1, LY2, LX1, LX2.

In this manner the integer N can be determined without the measurement of the group delay time tg. Also, even such configuration, the error generated by the approximate constant setting is given by the equation (23). It will therefore be understood that the influence of such approximate constant setting can be minimized by minimizing the value of L1.

As explained in the foregoing, the distance measuring device or the coordinate input device for determining the integer N by suitable means and calculating the distance according to the equation (2) can effect precise distance calculation even when the constants required for distance calculation can only be obtained approximately, by selecting an optimum combination of the plate thickness and the frequency of the Lamb wave, in relation to the material constituting the plate.

As explained in the foregoing, the distance measuring device or the coordinate input apparatus of the present invention employs the Lamb wave for detection. As already known, the velocity of the Lamb wave depends, in addition to the material constituting the transmitting plate, the frequency f of the Lamb wave and the thickness d of the plate. Consequently, in the mass production of the device utilizing such Lamb wave, the wave velocity varies from device to device because of the fluctuation of the frequency f and the plate thickness d by the tolerance of the components. Stated differently, a constant wave velocity requires no tolerance in the components, so that the cost becomes very high. For avoiding such drawback, there is required means for determining the wave velocity in each individual device, but the conventional determination of the wave velocity from the relationship between the wave arrival time and the distance requires a long time, and such determination, if conducted in each device, hinders the mass producing operation. It is therefore proposed, utilizing the properties of the Lamb wave, to at first measure the plate thickness d (easily measurable for example with a laser) and the frequency f of the Lamb wave (calculated from the phase period of the detected signal waveform), thereby determining the phase velocity Vp and the group velocity Vg, but this method cannot exactly determine the frequency f. Thus this method is unable to exactly determine the frequency f, phase velocity Vp and group velocity Vg, but can provide approximate values thereof in a simple manner. Although it is also important to determine the constants in more accurate manner, it is possible to minimize the generated error by optimum setting of the frequency f of the Lamb wave and the plate thickness d as explained in the foregoing, thereby avoiding the loss in the precision of the distance measurement. It is therefore rendered possible, in a device utilizing the Lamb wave, of which velocity varies from device to device, to set an approximate wave velocity in a simple manner and to effect precise distance calculation-even with such approximate wave velocity. Furthermore, such configuration enables mass production of highly reliable devices in an inexpensive manner.

What is claimed is:

1. A distance measuring device comprising:

a vibration transmitting plate in which a vibration entered by a vibration source into said vibration transmitting plate propagates as a Lamb wave; and means for calculating the distance from said vibration source to vibration detection means based on the propagation time of said Lamb wave in said vibration transmitting plate from said vibration source to said vibration detection means, wherein the frequency f of said Lamb wave measured as a signal and the thickness d of said vibration transmitting plate in which said Lamb wave propagates are so set as to minimize a function G(f, d) defined below:

$$G(f, d) = Vg \cdot Vp/\{f(Vg-Vp)\}$$

in which f: frequency of the Lamb wave

Vg: group velocity (depending on frequency f and thickness d of said vibration transmitting plate)

Vp: phase velocity (depending on frequency f and thickness d of said vibration transmitting plate).

2. A distance measuring device according to claim 1, wherein said calculating means comprises:

means for measuring and releasing an arrival time tp of the wave, the arrival time tp relating to said phase velocity Vp; and means for effecting distance calculation, employing thus released arrival time, said frequency f of the Lamb wave, and the phase velocity Vp as set constants.

3. A distance measuring device according to claim 1, wherein said calculating means comprises:

means for measuring and releasing an arrival time tg of the wave, the arrival time tg relating to said group velocity Vg, and an arrival time tp of the wave, the arrival time tp relating to said phase velocity Vp; and means for effecting distance calculation, employing thus released arrival times, said frequency f of the Lamb wave, the phase velocity Vp and the group velocity Vg as set constants.

4. A coordinate input apparatus comprising:

a vibration transmitting plate in which a vibration entered by a vibration source into said vibration transmitting plate propagates as a Lamb wave; and means for calculating and releasing the coordinate position of said vibration source on said vibration transmitting plate, based on the propagation times of said Lamb wave from said vibration source through said vibration transmitting plate to plural vibration detection means fixed thereon, wherein the frequency f of said Lamb wave measured as a signal and the thickness d of said vibration transmitting plate in which said Lamb wave propagates are so set as to minimize a function G(f, d) defined below:

$$G(f, d) = Vg \cdot Vp/\{f(Vg-Vp)\}$$

in which f: frequency of the Lamb wave

Vg: group velocity (depending on frequency f and thickness d of said vibration transmitting plate)

Vp: phase velocity (depending on frequency f and thickness d of said vibration transmitting plate).

5. A coordinate input apparatus according to claim 4, wherein said calculating and releasing means comprises:

means for measuring and releasing an arrival time tp of the wave, the arrival time tp relating to said phase velocity Vp; and means for effecting distance calculation, employing thus released arrival time, said frequency f of the Lamb wave, and the phase velocity Vp as set constants.

6. A coordinate input apparatus according to claim 4, wherein said calculating and releasing means comprises:

means for measuring and releasing an arrival time tg of the wave, the arrival time tg relating to said group velocity Vg, and an arrival time tp of the wave, the arrival time tp relating to said phase velocity Vp; and means for effecting distance calculation, employing thus released arrival times, said frequency f of the Lamb wave, the phase velocity Vp and the group velocity Vg as the set constants.

* * * * *

UNITED STATES PATENT AND TRADEMARK OFFICE
CERTIFICATE OF CORRECTION

PATENT NO. : 5,570,302
DATED : October 29, 1996
INVENTOR(S) : Kobayashi et al.

It is certified that error appears in the above-indentified patent and that said Letters Patent is hereby corrected as shown below:

COLUMN 5:

Line 27, "counter.," should read --counter,--.

COLUMN 17:

Line 59, "calculation-even" should read --calculation even--.

Signed and Sealed this

Fifteenth Day of April, 1997

Attest:

BRUCE LEHMAN

Attesting Officer      Commissioner of Patents and Trademarks